(12) United States Patent
Psarologos et al.

(10) Patent No.: US 11,857,102 B2
(45) Date of Patent: Jan. 2, 2024

(54) ADVANCED DRIP FILTER COFFEE MAKER

(71) Applicant: BREVILLE PTY LIMITED, Alexandria (AU)

(72) Inventors: Con Psarologos, Bardwell Valley (AU); Gerard Andrew White, Darlington (AU); Alex Ming Duk Leung, Alexandria (AU); Richard Harrod, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 646 days.

(21) Appl. No.: 17/012,044

(22) Filed: Sep. 3, 2020

(65) Prior Publication Data

US 2020/0397178 A1 Dec. 24, 2020

Related U.S. Application Data

(63) Continuation of application No. 15/504,321, filed as application No. PCT/AU2015/000504 on Aug. 20, 2015, now abandoned.

(30) Foreign Application Priority Data

Aug. 20, 2014 (AU) .............................. 2014903275

(51) Int. Cl.
| | | |
|---|---|---|
| A47J 31/057 | (2006.01) | |
| A47J 31/06 | (2006.01) | |
| A47J 31/02 | (2006.01) | |
| A47J 31/44 | (2006.01) | |
| A47J 31/52 | (2006.01) | |
| A47J 31/36 | (2006.01) | |
| A47J 31/10 | (2006.01) | |

(52) U.S. Cl.
CPC ........... *A47J 31/02* (2013.01); *A47J 31/0573* (2013.01); *A47J 31/061* (2013.01); *A47J 31/0605* (2013.01); *A47J 31/106* (2013.01); *A47J 31/36* (2013.01); *A47J 31/44* (2013.01); *A47J 31/4403* (2013.01); *A47J 31/4407* (2013.01); *A47J 31/4457* (2013.01); *A47J 31/4482* (2013.01); *A47J 31/52* (2013.01); *A47J 31/521* (2018.08); *A47J 31/525* (2018.08); *A47J 31/4492* (2013.01)

(58) Field of Classification Search
CPC ...... A47J 31/5255; A47J 31/525; A47J 31/34; A47J 31/36; A47J 31/0573; A47J 31/0605; A47J 31/0615
USPC ....................................... 99/283, 302 R, 307
See application file for complete search history.

(56) References Cited

U.S. PATENT DOCUMENTS 5,868,062 A    2/1999  Enomoto
7,958,815 B2*  6/2011  Kodden .............. A47J 31/0657
                                                99/302 R (Continued)

FOREIGN PATENT DOCUMENTS

CN    101336792 A    1/2009
DE    3112231 A1    10/1982

(Continued)

*Primary Examiner* — Reginald Alexander
(74) *Attorney, Agent, or Firm* — Quarles & Brady LLP

(57) ABSTRACT

A drip filter coffee making device has a filter basket with a lid. The lid supports a water dispenser for wetting grounds in the filter basket. The basket is removable from a body of the device. The lid may have a dampened opening motion, biased into an open position by a spring.

8 Claims, 32 Drawing Sheets

(56) References Cited

U.S. PATENT DOCUMENTS

| | | | |
|---|---|---|---|
| 10,226,152 B2* | 3/2019 | Howitt | A47J 31/545 |
| 2005/0076788 A1* | 4/2005 | Grant | A47J 31/58 |
| | | | 99/279 |
| 2010/0229731 A1 | 9/2010 | de Longhi | |
| 2011/0171350 A1 | 7/2011 | Remo | |
| 2012/0308688 A1 | 12/2012 | Peterson | |
| 2013/0032036 A1* | 2/2013 | Zhong | A47J 31/5255 |
| | | | 99/294 |
| 2013/0209636 A1 | 8/2013 | Cominelli | |
| 2016/0137402 A1* | 5/2016 | Talon | B65D 85/8055 |
| | | | 426/115 |
| 2016/0174759 A1* | 6/2016 | Cavanagh | A47J 31/407 |
| | | | 99/295 |

FOREIGN PATENT DOCUMENTS

| | | | |
|---|---|---|---|
| GB | 2481023 A | 12/2011 | |
| NL | 1002420 C2 | 8/1997 | |
| WO | 2013132375 A1 | 9/2013 | |

\* cited by examiner

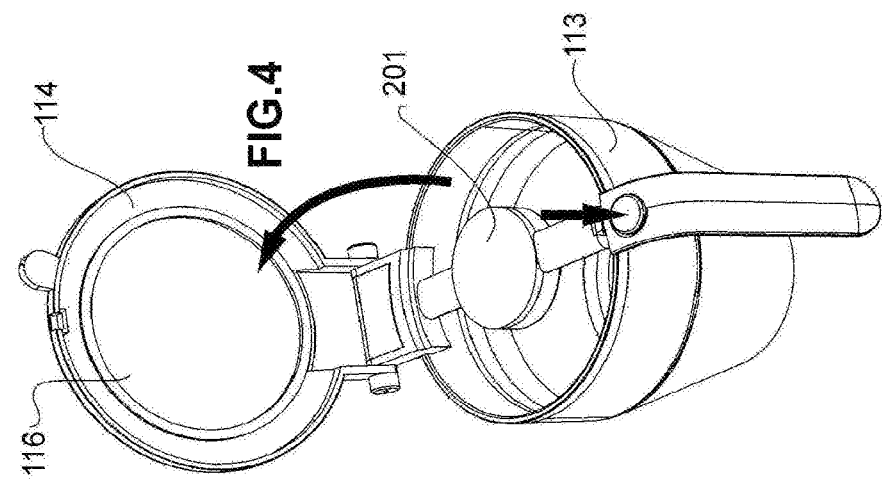
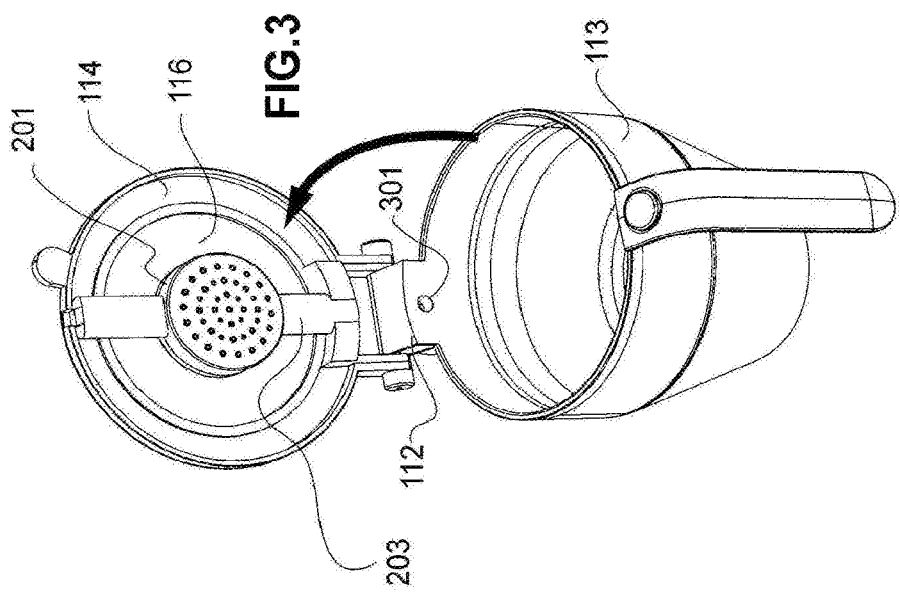

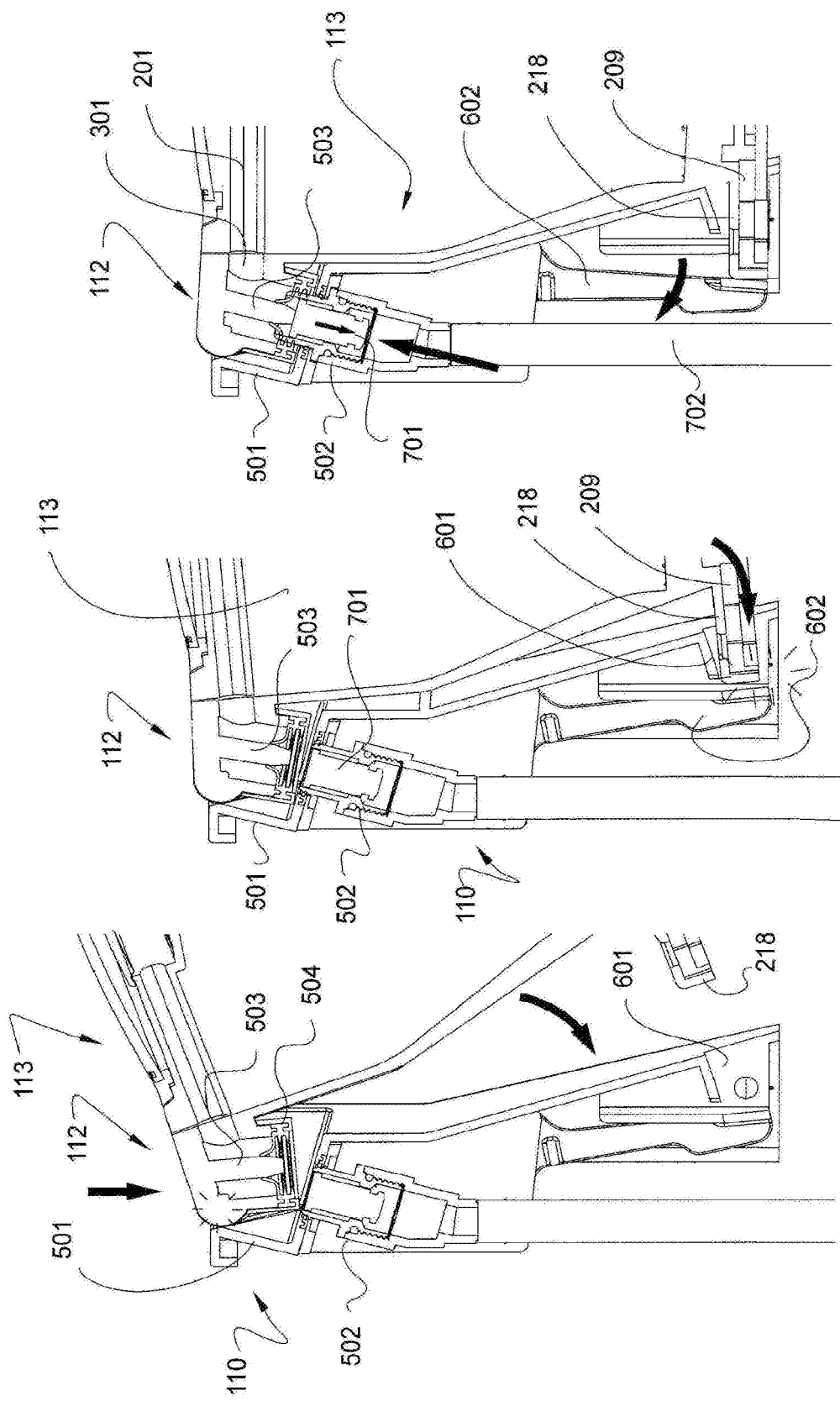

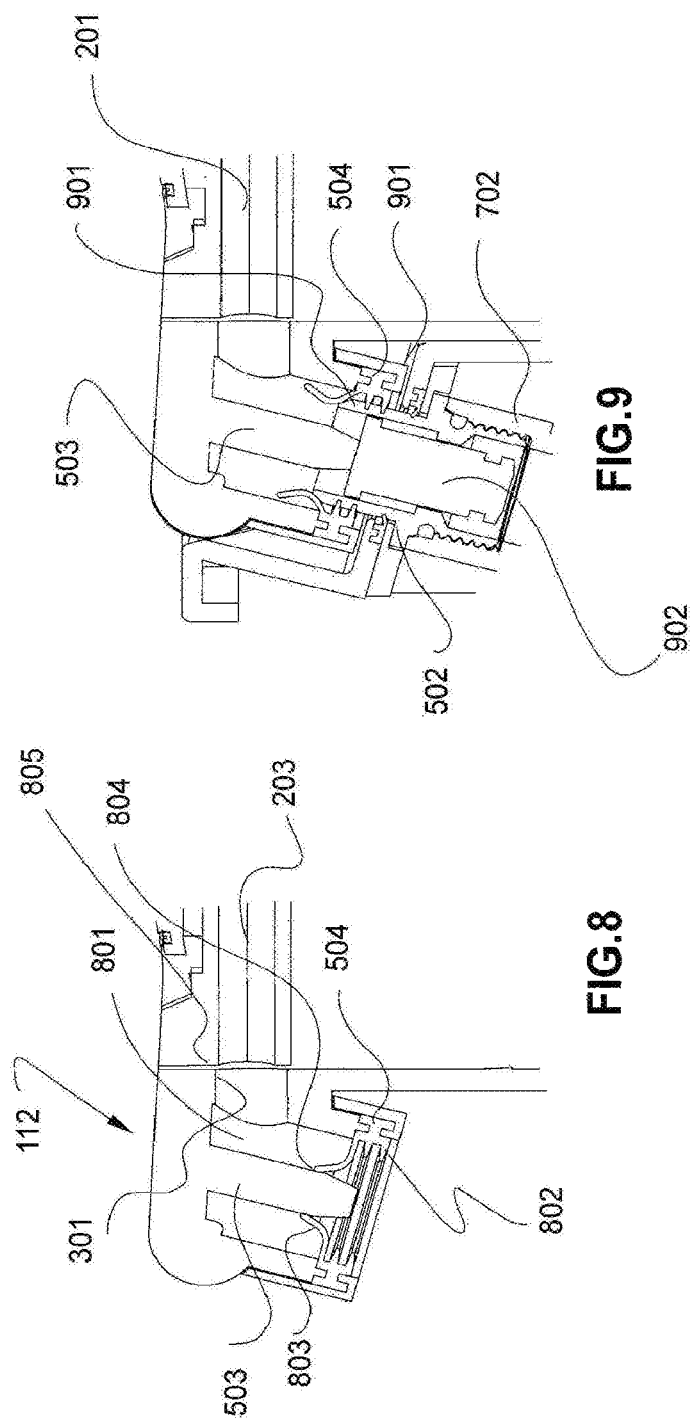

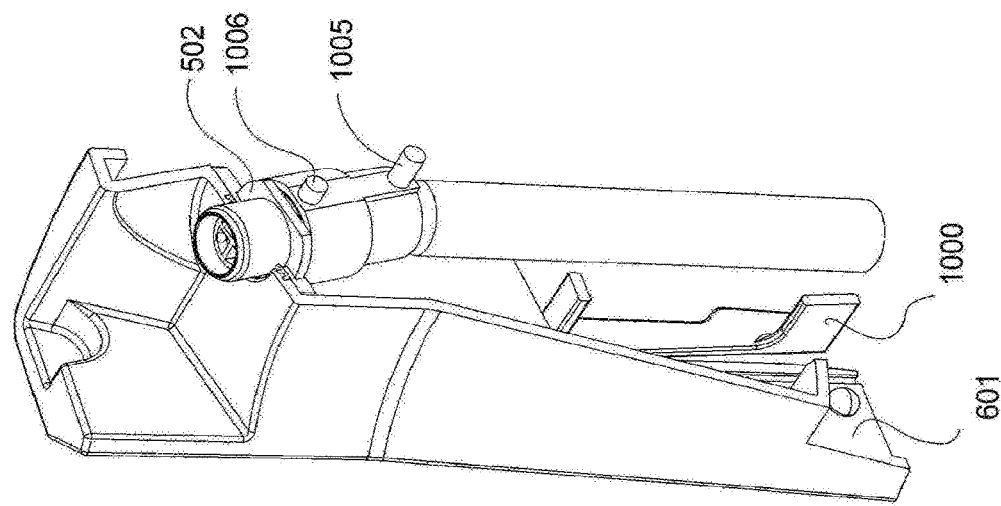
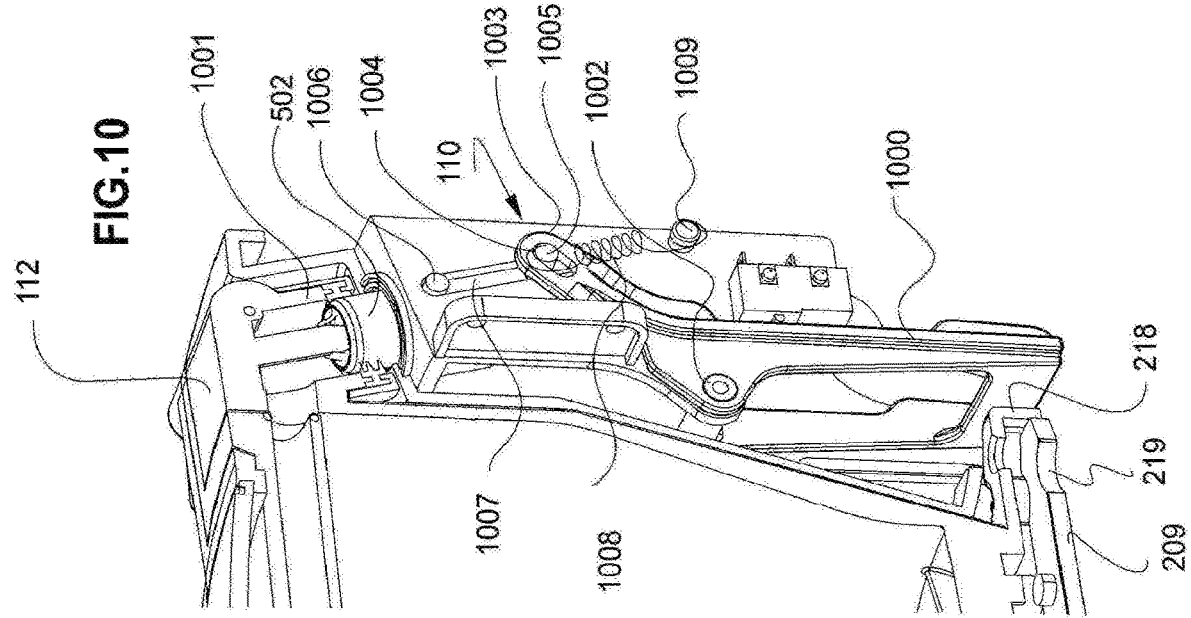

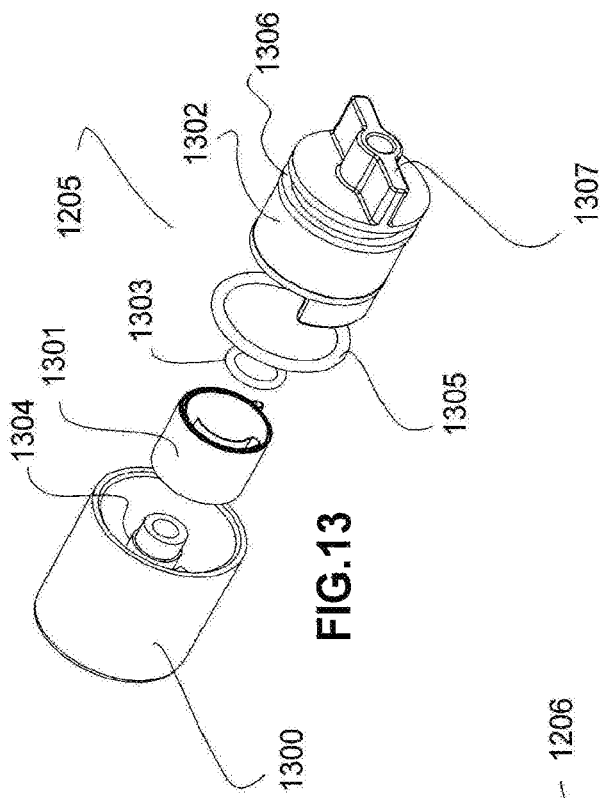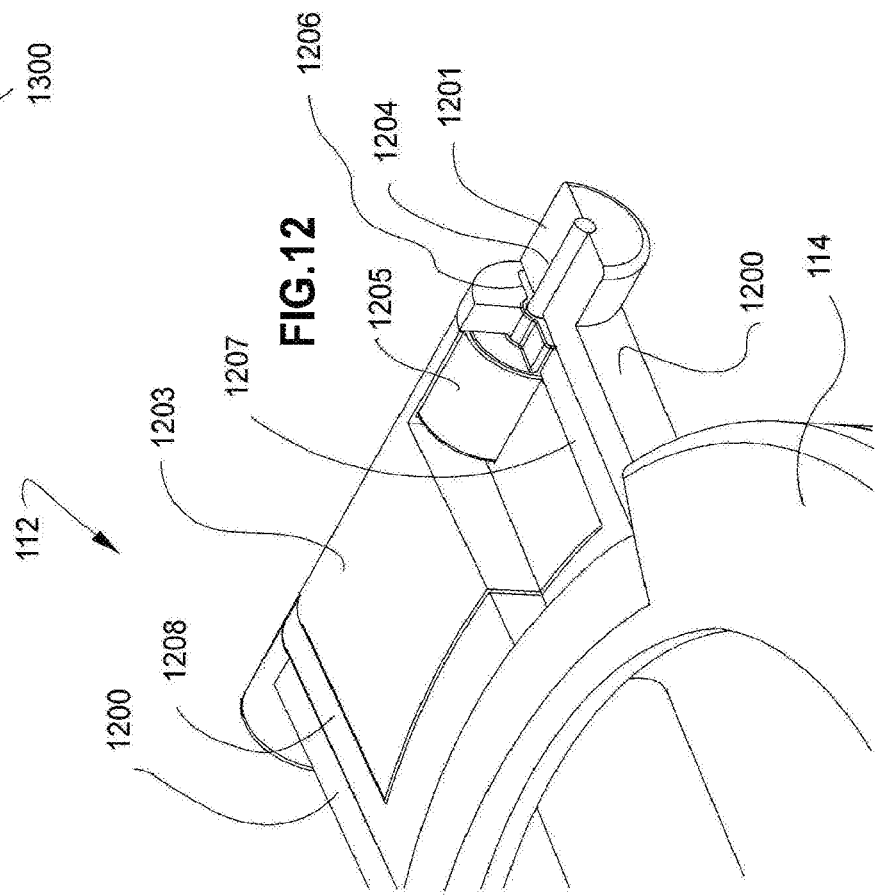

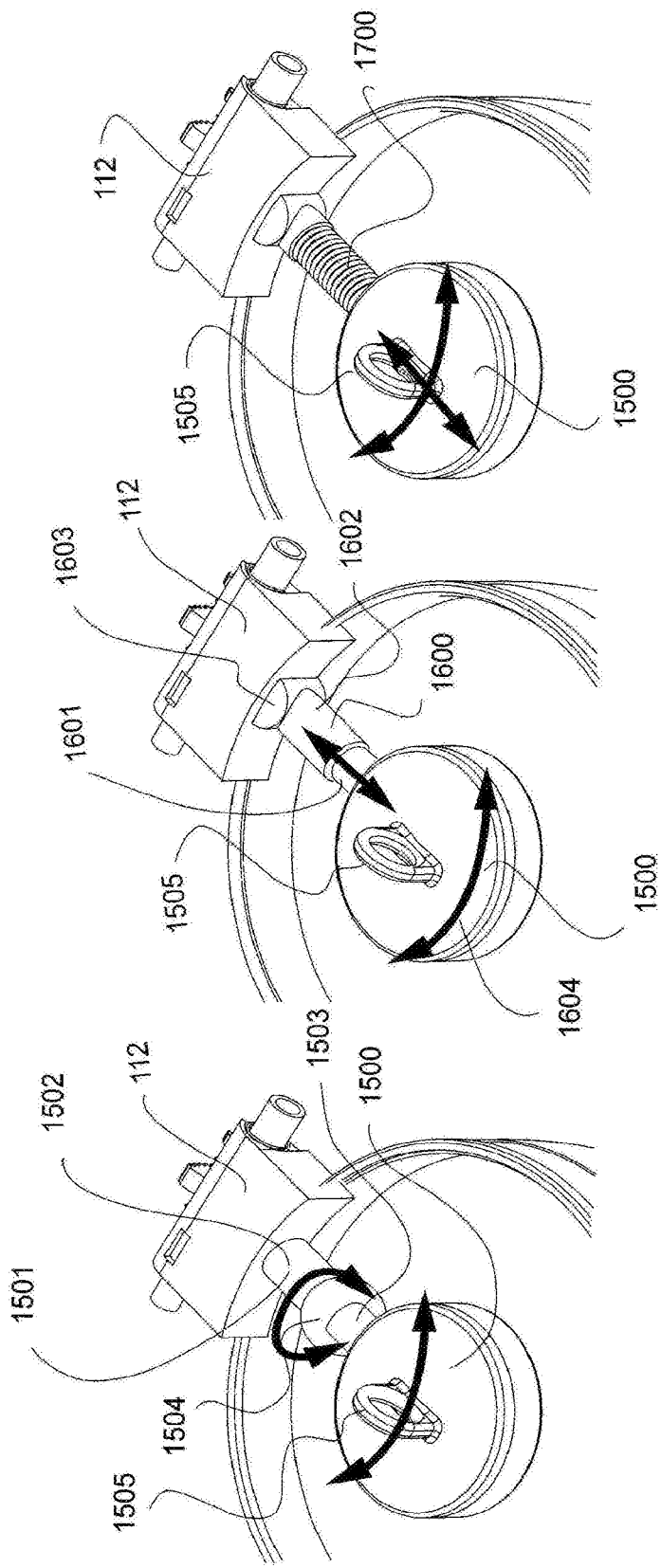

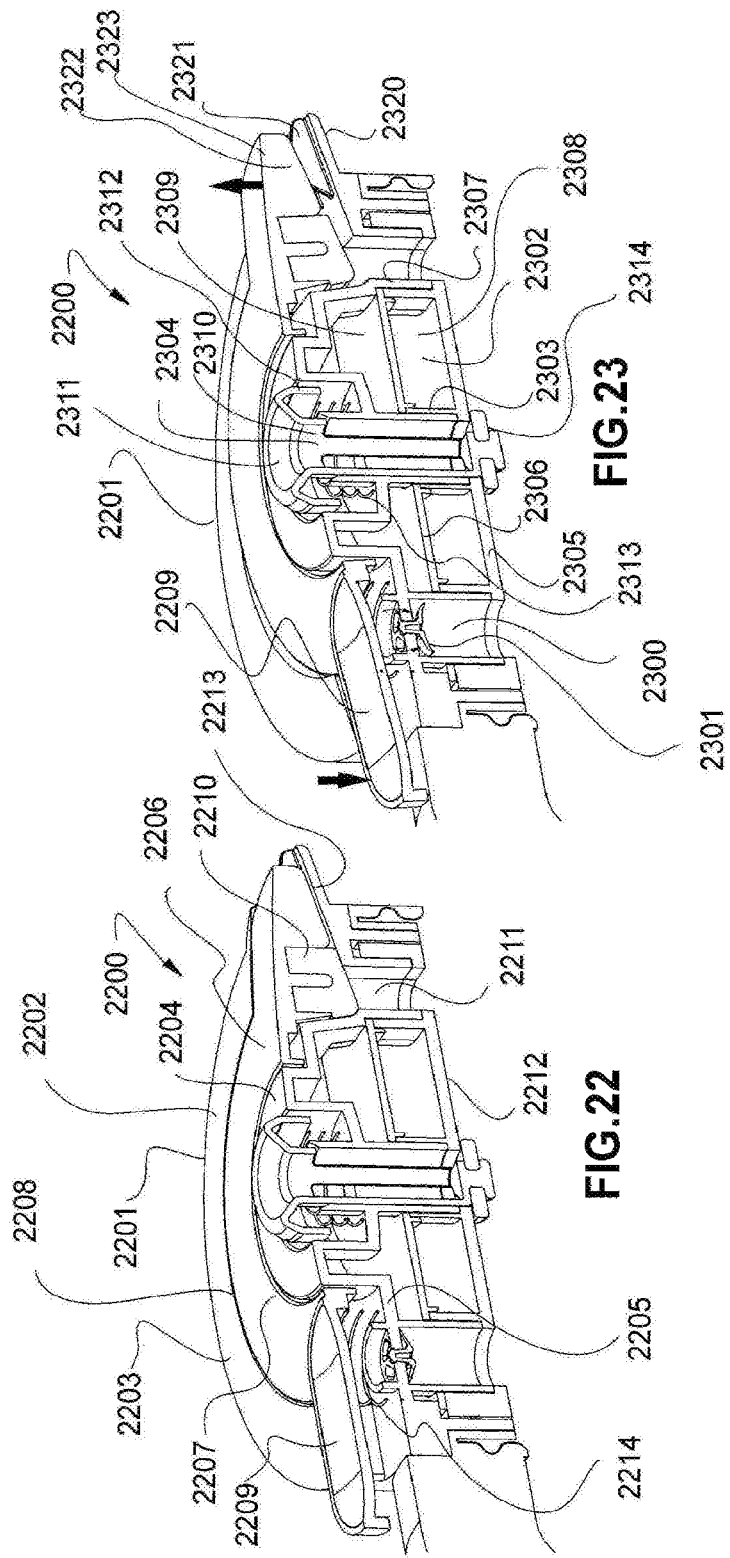

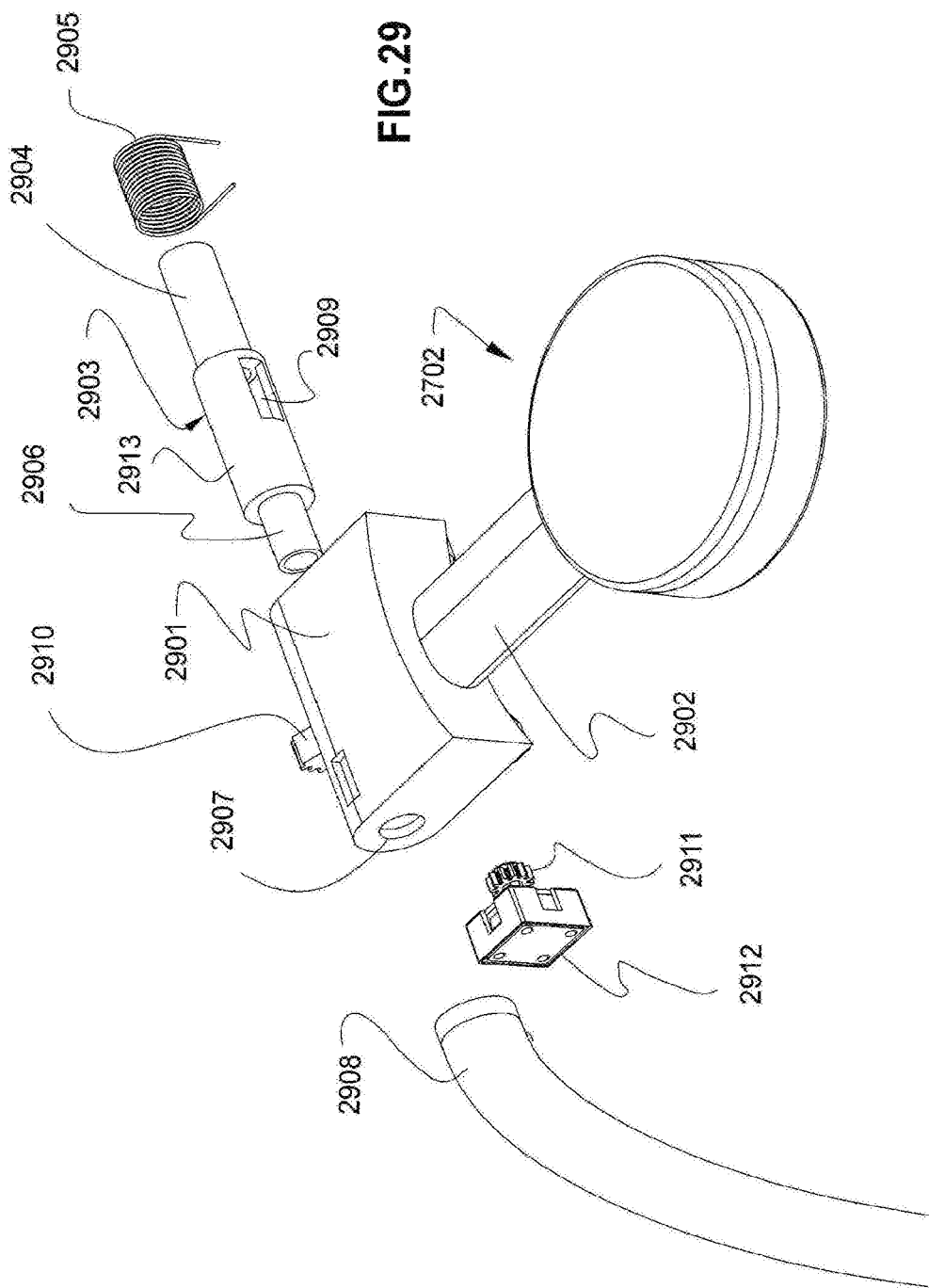

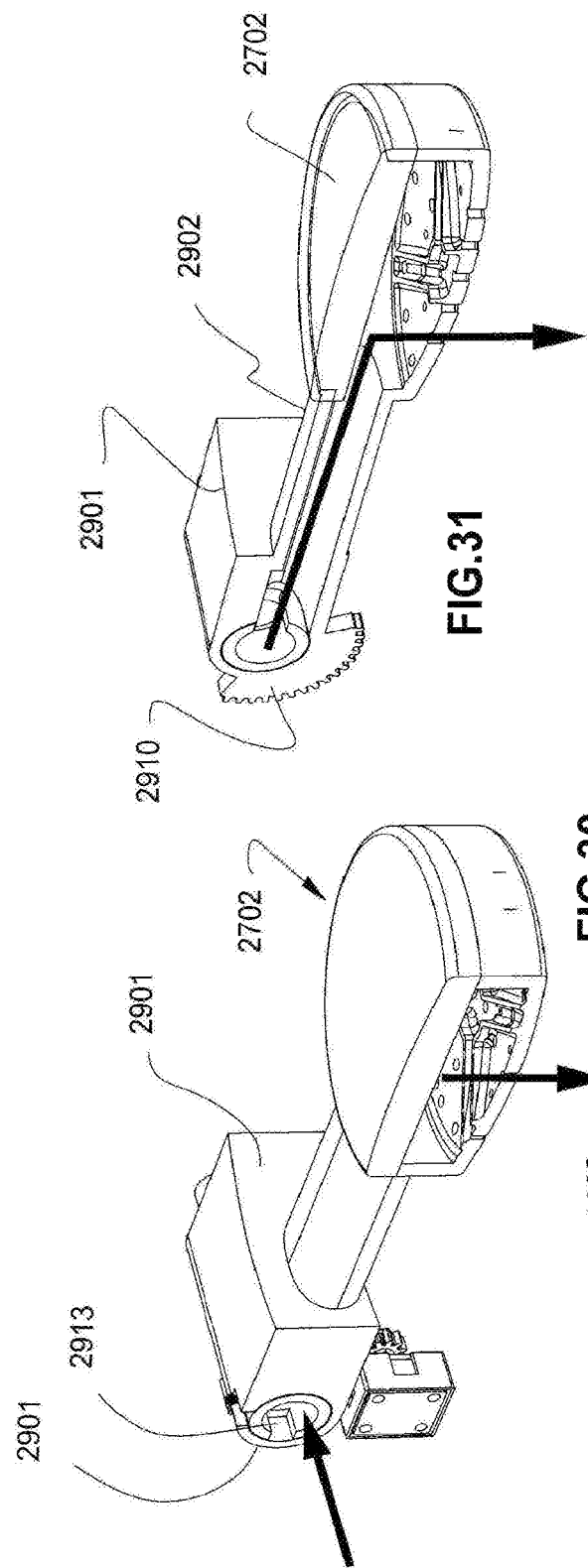

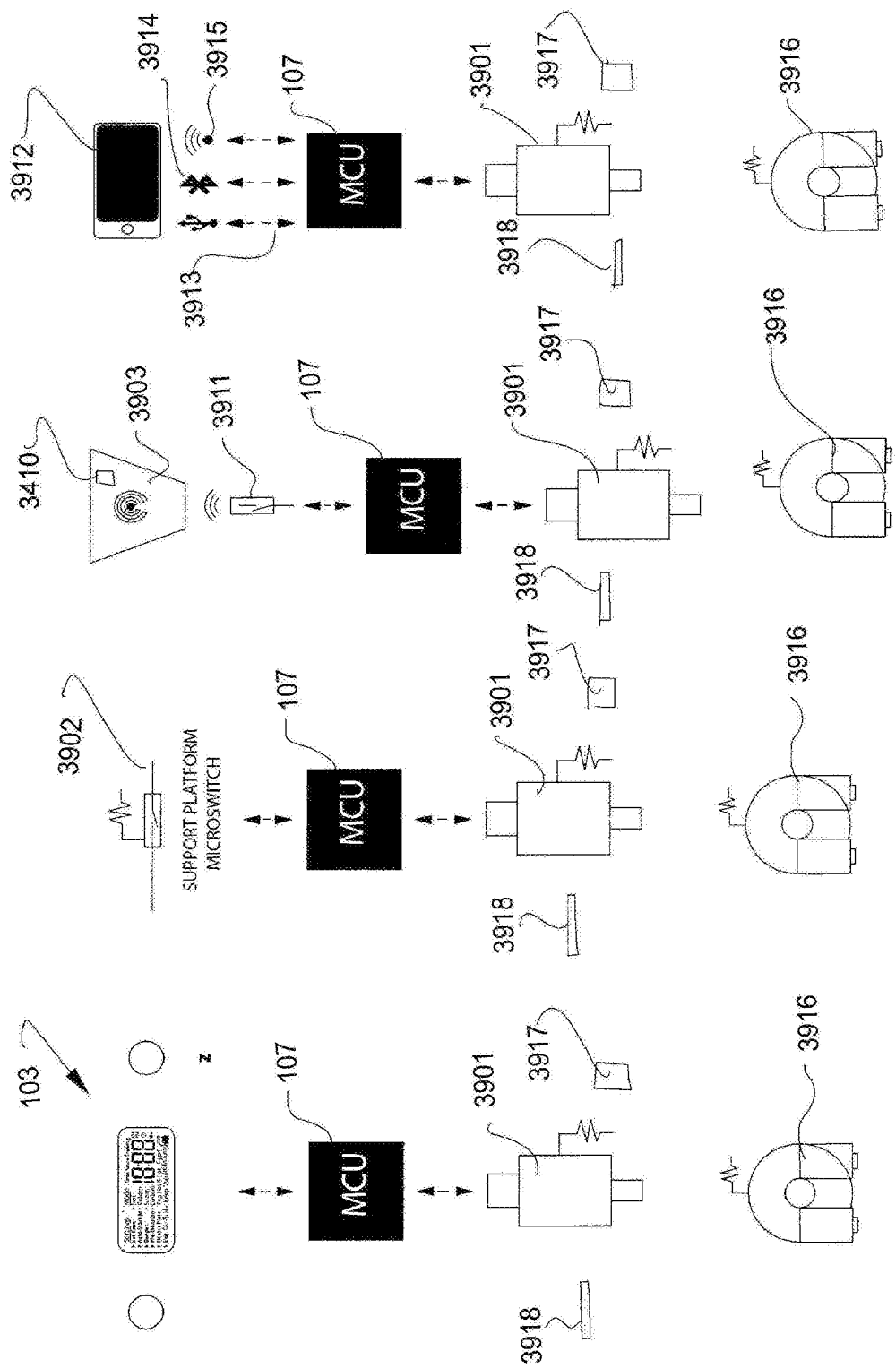

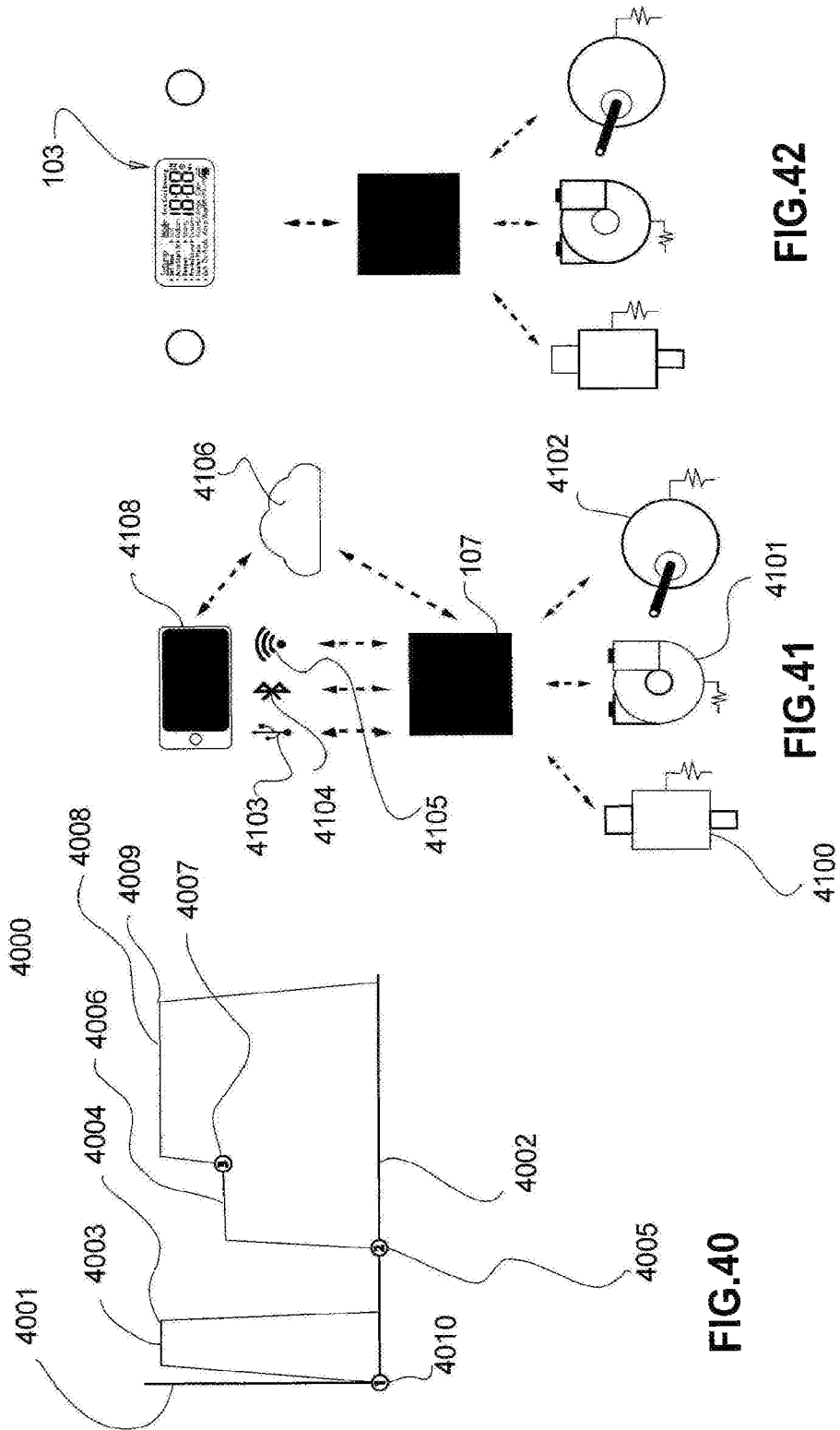

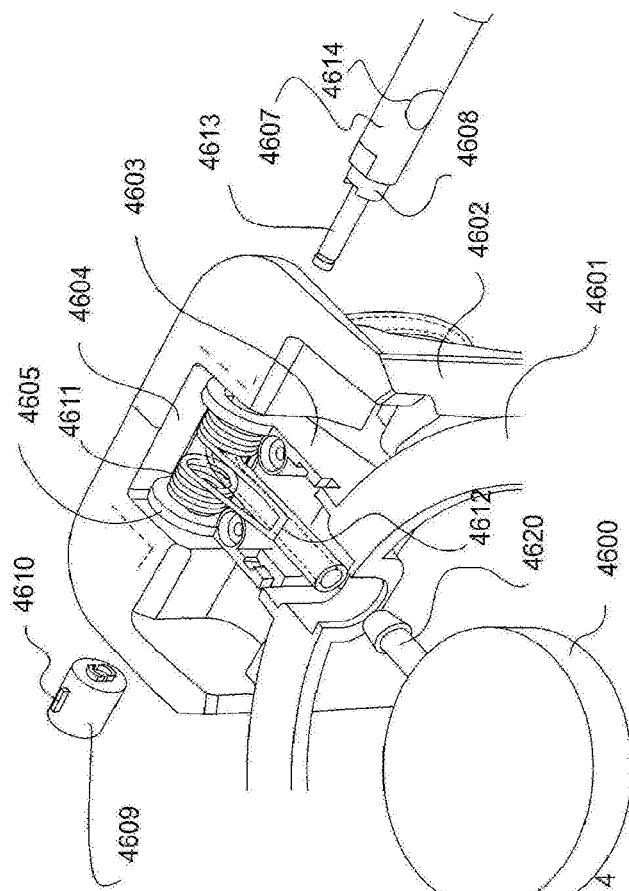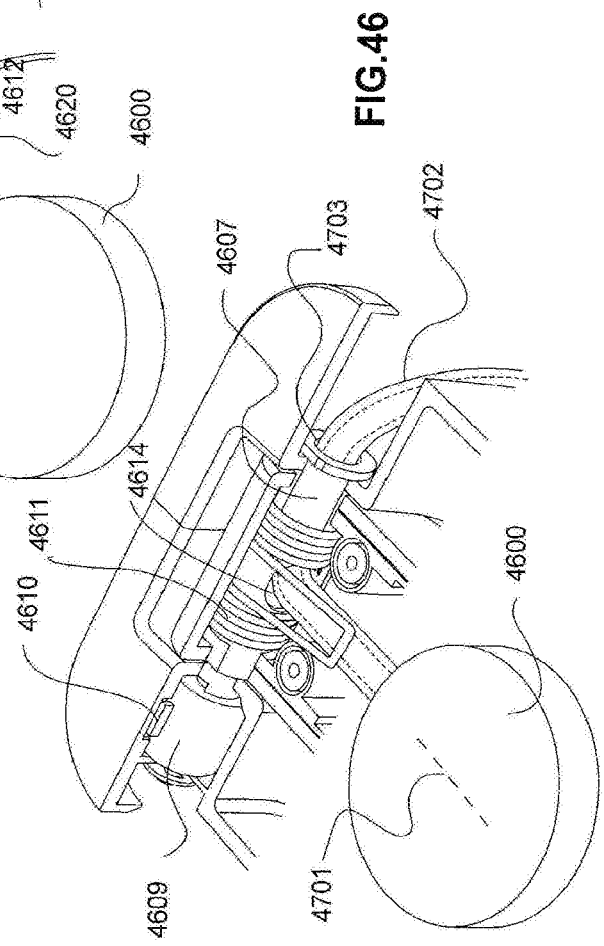

ADVANCED DRIP FILTER COFFEE MAKER

FIELD OF THE INVENTION

The invention relates to coffee making appliances and more particularly to a drip filter coffee making appliance.

BACKGROUND OF THE INVENTION

In a typical drip filter coffee machine, a water dispensing showerhead is fixed to the main body of the device above a removable filter basket. The disadvantage of this arrangement is that the filter basket is difficult to remove because of the presence of the showerhead. Further, the showerhead can be difficult to clean. Utilizing a conventional drip coffee machine with pour over type filters as provided by Hario® and Chemex® can be difficult to use.

SUMMARY OF THE INVENTION

Described herein is a drip filter coffee machine that offers improvements and options intended to address shortcomings in the prior art.

Also described herein is a drip filter coffee making machine with advantages and features not found on prior art drip filter coffee machines.

Accordingly, a drip filter coffee making device has a body that supports a filter basket. The filter basket has a lid and the lid is biased into an open position by a spring and retained in a closed position by a latch mechanism. An opening of the lid into the open position is resisted by a damping mechanism carried by the filter basket.

In another embodiment, a drip filter coffee making device has body that supports a filter basket with a hinged lid. An underside of the lid supports a water dispenser. The filter basket is removable and comprises a first fluid coupling half that engages and disengages cooperating second fluid coupling half carried by the body.

BRIEF DESCRIPTION OF THE DRAWING FIGURES

In order that the invention be better understood, reference is now made to the following drawing figures in which:

FIG. 3 is a perspective view of a filter basket.

FIG. 4 is a perspective view of a filter basket.

FIG. 5 is a cross-sectional view through the hinge of a filter basket and its receiving pocket.

FIG. 6 is a cross-sectional view through the hinge of a filter basket and its receiving pocket.

FIG. 7 is a cross-sectional view through the hinge of a filter basket and its receiving pocket.

FIG. 8 is a cross-sectional view of the hinge assembly's actuator.

FIG. 9 is a cross-sectional view showing the hinge assembly actuator cooperating with a check valve element.

FIG. 10 is a perspective view, partially cross-sectioned, illustrating guide slots and a water connector.

FIG. 11 is a perspective view, partially cross-sectioned, illustrating a water connector and guide pins.

FIG. 12 is a perspective view, partially cross-sectioned, of hinge assembly.

FIG. 13 is an exploded perspective view of a damping mechanism.

FIG. 15 is a perspective view of a showerhead that can be manipulated by a user.

FIG. 16 is a perspective view of a showerhead that can be manipulated by a user.

FIG. 17 is a perspective view of a showerhead that can be manipulated by a user.

FIG. 22 is a perspective view, cross-sectioned to illustrate a lid construction.

FIG. 23 is a perspective view, cross-sectioned to illustrate a lid construction.

FIG. 29 is an exploded perspective view of a showerhead assembly.

FIG. 30 is a perspective view of a showerhead, partially cross-sectioned.

FIG. 31 is a perspective view of a showerhead, partially cross-sectioned.

FIG. 32 is a perspective view of a hinge and sensor.

FIG. 39 is a schematic diagram illustrating functions of a drip filter coffee maker's microprocessor control unit.

FIG. 40 is a graph illustrating a coffee brewing profile.

FIG. 41 is a schematic diagram illustrating the functionality of a microprocessor control unit in a drip filter coffee machine.

FIG. 42 is a schematic diagram illustrating the functionality of a microprocessor control unit in a drip filter coffee machine.

FIG. 45 is exploded perspective view of a dampened lid and its hinge mechanism.

FIG. 46 is exploded perspective view of a dampened lid and its hinge mechanism.

DETAILED DESCRIPTION

Figure 1:
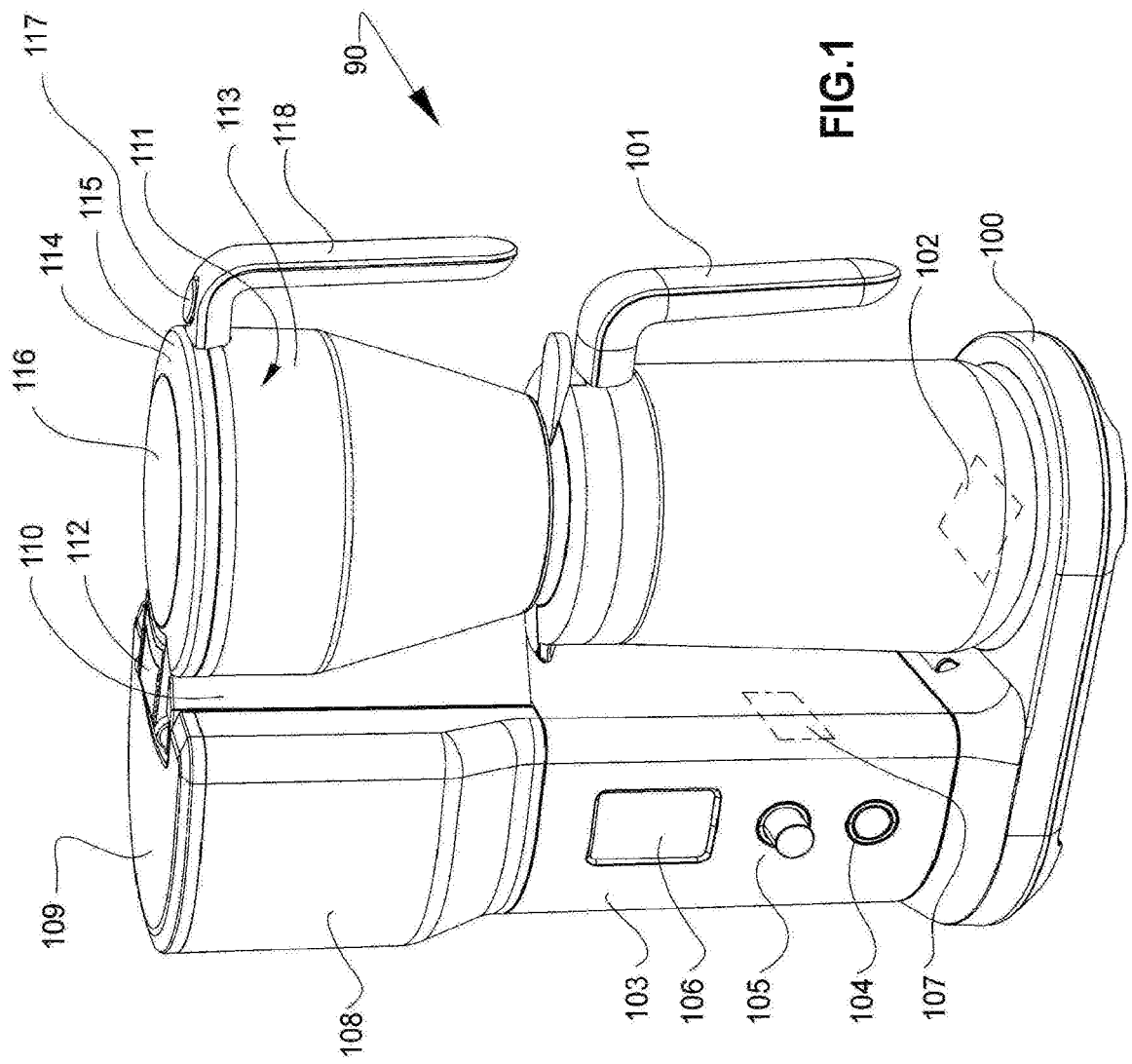
FIG. 1 is a perspective view of a drip filter coffee making appliance.

As shown in FIG. 1, a drip filter coffee machine 90 comprises a base 100 that removably supports a carafe 101. In this example, the carafe 101 is an insulated carafe. Particularly when the carafe 101 is not insulated, the base 100 may incorporate a warming element 102. The base 100 has affixed to it the upright body 103 of the coffee making appliance. The body 103 may have, on an outer surface, a user interface such as a touchscreen 106. The user interface 106 includes, for example, components such as a one or more push buttons 104, and one or more rotary encoders 105. The user interface also preferably comprises a graphic display such as an LCD interface or touchscreen 106. The buttons and encoders 104, 105 allow the user to send information, commands or signals to the device's processor 107. The processor 107 controls the operation of the device including driving the graphic interface 106 and in this way provides information regarding the operation of the device to the user. In this example, the body supports removable water reservoir 108 having a lid 109. The body 103 further comprises an upper or neck area 110 that is located between the removable reservoir 108 and a removable filter basket 111.

As will be explained, the removable filter basket 111 comprises a hinge assembly 112 that connects the body 113 of the basket to a lid such as a soft opening or dampened lid 114. The lid 114 has a peripheral or surrounding portion 115 and a central optionally transparent portion 116. The contents of the basket can be viewed through the transparent portion 116. The filter basket also has a handle 118. The handle incorporates, near the lid, a mechanical push button actuator 117 that deactivates the lock or latch that retains the lid in the closed position but that allows the lid to open when the button 117 is depressed. The entirety of the filter basket including filter basket body, hinge assembly, lid and handle is entirely removable from the body 103 of the appliance.

Figure 2:
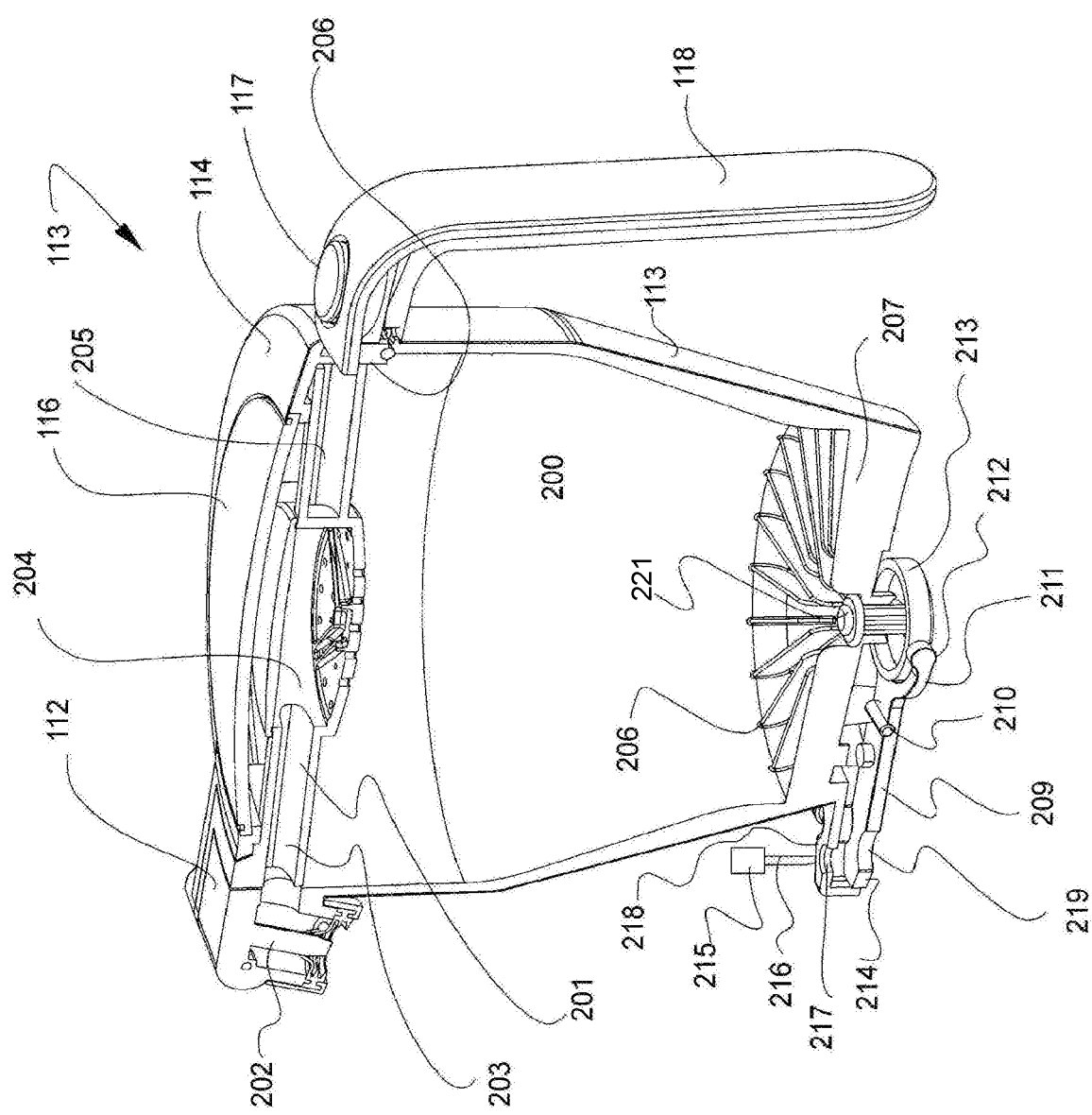
FIG. 2 is a cross-sectional view of a filter basket with internal showerhead.

As shown in FIG. 2, the filter basket 113 has a body having an interior compartment or chamber 200 adapted to receive a drip filter or inserted adapter (insert). In this example, the basket's hinge assembly 112 separately supports the pivoting lid 114 and its transparent central portion 116 together with a pivoting internal showerhead assembly 201. The hinge assembly 112 has an integral valve assembly 202 that allows the filter basket to mechanically and fluidically engage a water connector located in the body's neck 110. When the filter basket is connected to the neck 110 (as will be explained) water flows through the valve and hinge assembly 202, 112 and into a pivoting conduit 203 that leads to the water distributing showerhead 204. In this example, the showerhead 204 is located along the center line of the filter basket, below the transparent part of the lid 116. The showerhead may be braced against or supported by the basket's body 113 by one or more struts 205 that extend from the showerhead 204 to the wall of the basket's body 113.

A latch mechanism 206 is contained with the upper part of the handle 118 and selectively engages or releases the lid 114 in accordance with the operation of the push button actuator 117. The lower extent or floor 207 of the basket comprises an array of radially arranged ribs 208 that support the filter and promote efficient drainage. A drip-stop valve 208 occupies the center of the floor 207 and is located radially inward of the inner tips of the ribs 208. The drip-stop valve 221 is biased into a normally closed position but can be opened for fluid flow by the action of, for example, a carafe beneath it or the activation lever 209 that pivots about a shaft 210 that is carried below the floor 207. In this example, the lever 209 has a yoke 211 at one end. The yoke 211 has two terminal ends 212 that cooperate to pivotally retain the actuating head 213 of the drip-stop valve 221. When a suitable carafe 101 is located below the basket, the carafe's lid urges the actuating head 213 upward and thus unseats the drip-stop valve 221 so that coffee can flow through the valve 208 and into the carafe 101. The drip-stop valve 221 can also be opened by downward motion 214 of the distal end of the lever 209. The distal end of the lever can be driven by an actuator 215 having a pin or rod 216 that passes through an opening 217 in a protective shroud 218 that extends from a lower part of the basket. In this example, the distal end of the lever 209 features a pair of opposing recesses 219. The recesses 219 removably engage with a detent mechanism located in the neck 110 so that the user is provided with tactile feedback when installing the filter basket onto the neck 110.

Figure 2A:
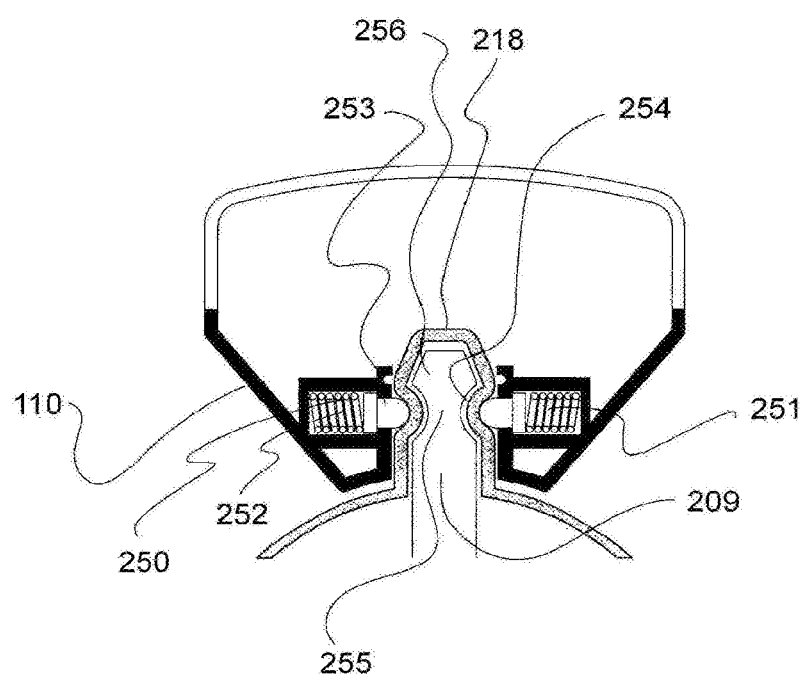
FIG. 2A is a cross-sectional view through the projecting shroud shown in FIG. 2.

As shown in FIG. 2A, the exterior shell of the coffee maker 90 particularly the neck area 110 contains at least one and preferably a pair of opposing detent mechanisms 250, 251. In this example, each detent mechanism comprises a captive compression spring or other mechanical bias 252 and a blunt or ball head 253. The spring urges the head 253 toward a recess or detent 254 formed in the projecting shroud 218. The internal activation lever 209 is shaped to conform to the interior of the shroud 218, having a neck area 255. The lever terminates in an enlarged head 256 for facilitating engagement with the actuator 215 or its rod 216.

As shown in FIG. 3, the lid 114 is free to open at any time, whether the basket is affixed to the neck area 110 of the appliance, or not. This allows a user to agitate the water and coffee slurry that is contained in the filter within the basket. This also allows a user to add ingredients while the unit is brewing. In this example, the hinge assembly 112 and its lid dampening mechanism bias the showerhead assembly 201 into the open or upright orientation depicted in FIG. 3. Thus, the pivoting of the showerhead assembly 201 causes the lid 114 to open by lifting the lid 114 into the open position. As shown in FIG. 4, once the lid and showerhead are both in the open position, the showerhead assembly 201 can be lowered into a conventional dispensing orientation at any time. The interior of the side wall of the basket 113 has a dispensing port 301 that disengages from the showerhead's conduit 203 and seals against or seals with the conduit 203 when the showerhead assembly 201 is in the dispensing orientation depicted in FIG. 4.

As shown in FIGS. 5, 6 and 7, the removable filter basket 113 is removably supported from, for example, the coffee appliance's neck area 110. The hinge assembly 112 is received by a receptacle, fixture or pocket 501 that accommodates the hinge assembly, the neck area and in this example the pocket having within it a fluidic coupling half or water connector 502 that cooperates with a second coupling half preferably having a pin-like actuator and seal arrangement 504 that are located in the hinge assembly or otherwise on the filter basket.

As shown in FIG. 6, as the hinge assembly is lowered into the pocket 501 the projecting shroud 218 and its internal lever 209, located at the bottom of the filter basket enter a slot 601 formed in the neck 110 that is beneath the pocket 501 and facing the filter basket 113. A pivoting water connector lever 602 is located in registry with the slot 601. When the distal end of the shroud enters the slot 601 and pushes against the lever 602, the lever acts to advance or raise the water connector 502 toward the actuator 503 and into engagement with the sealing arrangement 504 as shown in FIG. 7. As further shown in FIG. 7, the actuator 503 depresses a check valve 701 in the water connector 502. This permits water to flow through the water connector's supply tube 702, then through the water connector 502 to the port in the hinge assembly 301, and into the conduit 201 that supplies the showerhead 204.

The cooperation between the water connector 502 and the hinge assembly's actuator 503 and seal arrangement 504 are shown in more detail in FIGS. 8 and 9. In the example of FIG. 8, the seal between the internal chamber 801 of the hinge assembly 112 and the water connector nozzle and its internal check valve 502 comprises an internal, peripheral, polymeric seal. In this example, the seal has two internal circumferential seal lips 802 and an integral one-way flow seal 803 having an inner peripheral edge 804 that seals around the outer diameter of the actuator 503. The flow seal 803 acts as a check valve and prevents water contained in the chamber 801 from dripping out of the hinge assembly when it is disconnected from the water connector 502. A seal 805 is also interposed between the dispensing port 301 and the conduit 203.

As shown in FIG. 9, when the water connector 502 is in sealing engagement with the hinge assembly, the outer barrel or housing 901 may push the circumferential flow seal 803 out of engagement with the actuator 503, improving the flow rate through the connection. Simultaneously, the actuator 503 depresses the reciprocating check valve element 902 so that water can be pumped through the water supply tube 72 and into the showerhead's supply conduit 201. Withdrawal of the filter basket from the neck 110 closes the seal between the flow seal 803 and the actuator 503 as shown in FIG. 8.

As shown in FIGS. 10 and 11, the action of the filter basket, particularly the projecting shroud 218 against the water connector lever 1000, can be seen to cause the advancement of the water connector 502 into engagement with the sealed intake opening 1001 of the hinge assembly 112.

The water connector lever mechanism has a lever 1000 that is connected by an intermediate pivot 1002 to the chassis of the coffee making appliance and in this example, to that part of the chassis that is associated with or located within the neck area 110. The pivoting lever 1000 has one or a pair of projecting side plates 1003. Each side plate has an elongated opening 1004 that engages a lower pin carried by the water connector 502. The water connector may also have an upper guide pin 1006. The pins 1005, 1006 reciprocate in a guide slot 1007 formed in the neck area or chassis component that retains the reciprocating water connector 5002. Thus, advancement of the shroud 218 causes the lever 1000 to rotate around the pivot 1002. This drives the plate or plates 1003 upward, thus urging the water connector 5002 upward. A tension spring 1008 may be connected between a point on the chassis 1009 and, for example, the pin 1005 so as to retract the water connector 5002 when the filter basket and its shroud 218 are removed from the coffee machine.

As shown in FIGS. 12 and 13, an example of a hinge assembly suitable for the filter basket shown in FIGS. 1-11 comprises a pair of arms 1200 that are affixed to and extend away from the rim of the lid 114. In this example, the arms terminate in an enlargement or boss 1201 that retains a hinge pin 1204. In this example, the hinge pin may extend from one arm to the other and passes through the central body 1203 of the hinge assembly 112. The central body 1203 is attached to or integral with the filter basket 111. The central body 1203 contains the interior chamber 801 of the hinge assembly and the port 301 that leads to the showerhead's conduit 201. The central body 1203 is also fitted with a spring loaded dampening mechanism 1205.

As suggested by FIGS. 12 and 13, the dampener or damping mechanism has a cylindrical and open ended rear housing 1300 that contains a coiled spring 1301. A dampening cartridge such as a grease filled dampening cartridge 1302 is retained within the housing 1300 and is sealed with respect to the environment by a first O-ring seal 1303 against the arbor or spindle 1304 within the housing 1300 and by a second O-ring seal 1305 that fits in a circumferential groove 1306 at one end of the damping cartridge 1302 and a cooperating groove on an inner surface of the housing 1300. The cartridge 1302 terminates in a rotator, coupling or blade 1307. The rotator or blade 1307 fits within a cooperating slot 1206 formed at the end of one of the two arms 1207 that is carried by the showerhead assembly. The showerhead assembly has, in this example, two parallel arms 1207, 1208 that are sandwiched between the outer arms 1200 that are affixed to the lid and the central body of the hinge assembly 1203. In this way, the damping assembly depicted in FIG. 13, while retained by the central body 1203, exerts a resistive torque or rotating force on the arms of the showerhead so as to dampen any spring force that rotates the lid into an open position when the latch that retains the lid is disengaged.

Figure 14:
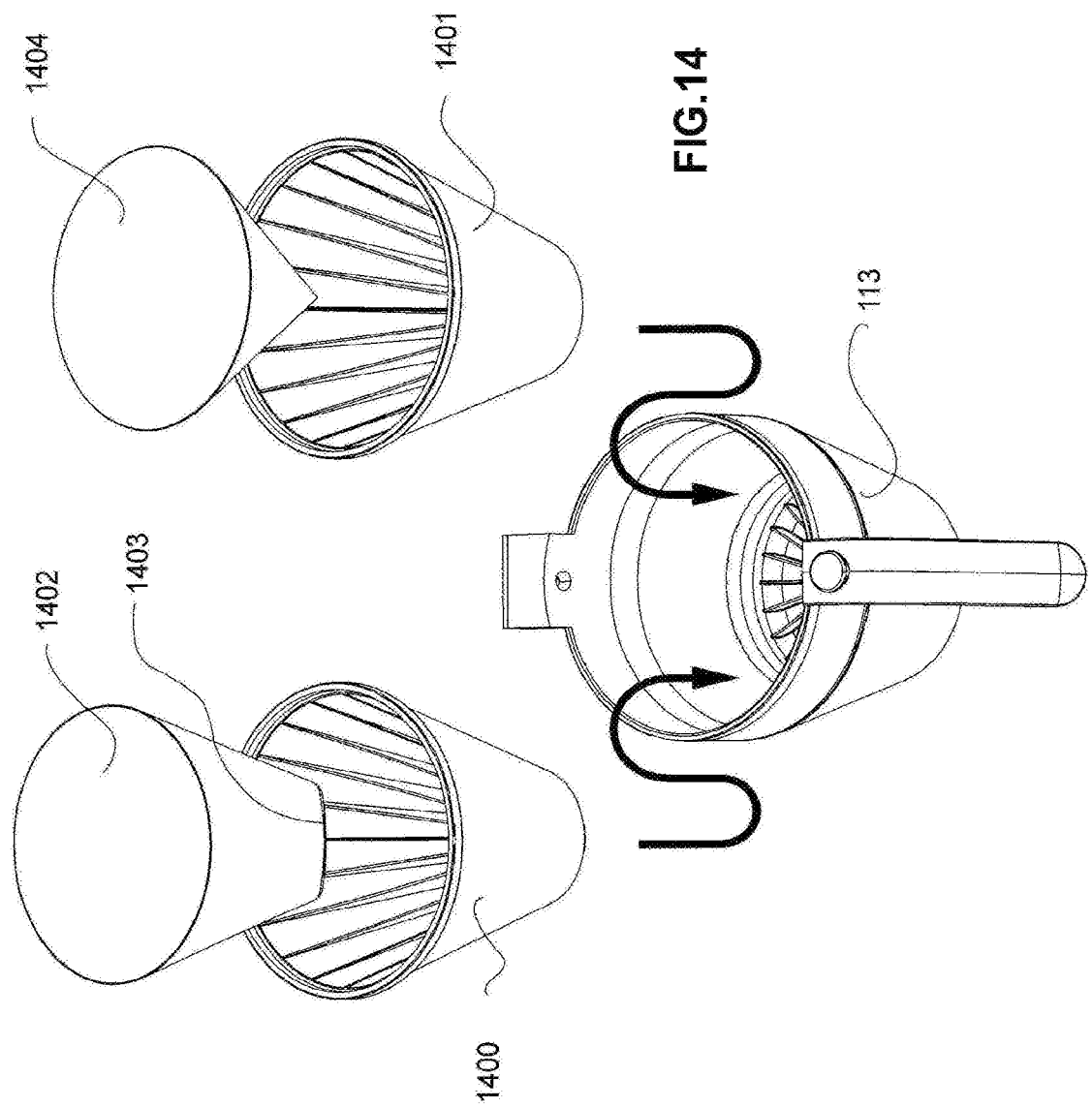
FIG. 14 is a perspective view illustrating inserts and filters for a filter basket.

Because the lid of the filter basket depicted in FIGS. 1-13 can be fully opened while still mounted on the coffee making appliance, users can prepare "pour over" filter coffee as suggested by FIG. 14. With the lid open, the filter basket body 113 can accept a variety of filter holders or filter adaptor inserts 1400, 1401. One type of removable filter adaptor is, for example, a European style filter holding insert that fits within the filter basket 113. The European style insert is adapted to receive a disposable European style filter paper 1402 having the characteristic linear bottom seam 1403. Another style insert fits within the body 113 of the filter basket and is adapted to receive a disposable conical filter 1404 such as those provided by Hario®. With an insert or adaptor 1400, 1401 located in the filter basket 113, the insert can be loaded with, for example, a textile filter 1402, 1404. Coffee is then added to the interior of the filter and hot water is manually or otherwise dispensed into the filter. The drip-stop valve 221 can be manually or automatically regulated in accordance with the user's preferences, coffee dose or style in this basket configuration.

As shown in FIGS. 15-20, the water dispensing showerhead 1500 need not have a fixed or constant spray pattern nor be immobile with respect to the hinge assembly 112. It will be recalled that the hinge assembly dispenses into a pivoting showerhead assembly as previously explained. Another embodiments, the showerhead's conduit is permanently mounted to the hinge assembly, particularly when the hinge assembly 112 is not removable from the neck 110 of the coffee making appliance. Thus, the examples of FIGS. 15-20 represent alternative arrangements of moveable showerheads 1500 that can be utilized regardless of how the showerhead's supply conduit 1501, 203 is connected to the appliances water supply or its hinge assembly. In the example of FIG. 15, the conduit 1501 comprises two portions 1502, 1503 that are interconnected by a ball joint or other flexible joint 1504. Water flows through both segments 1502, 1503 and the ball joint 1504 before entering the showerhead 1500. In order to facilitate movement between the two conduit sections 1502, 1503, the showerhead 1500 is provided with a grip or handle 1505. In this example, the handle 1505 is a ring that is centrally located on the upper surface of the showerhead.

As shown in FIG. 16, a showerhead 1500 with a handle 1505 may also be mounted at the end of a telescopic conduit 1600. The telescopic conduit 1600 has nesting segments 1601, 1602 that allow the showerhead 1500 to be rotated and moved towards or away from the hinge assembly 112. In addition, the arrangement depicted in FIG. 16 can be provided with ball joint or rotating joint 1603 that allows the conduit, regardless of type, to pivot in a horizontal plane 1604.

In the example of FIG. 17, the showerhead 1500 and handle 1505 are mounted on a flexible conduit 1700. The flexible conduit 1700 allows the showerhead to move with a wide range of motions relative to the filter basket.

Figure 19:
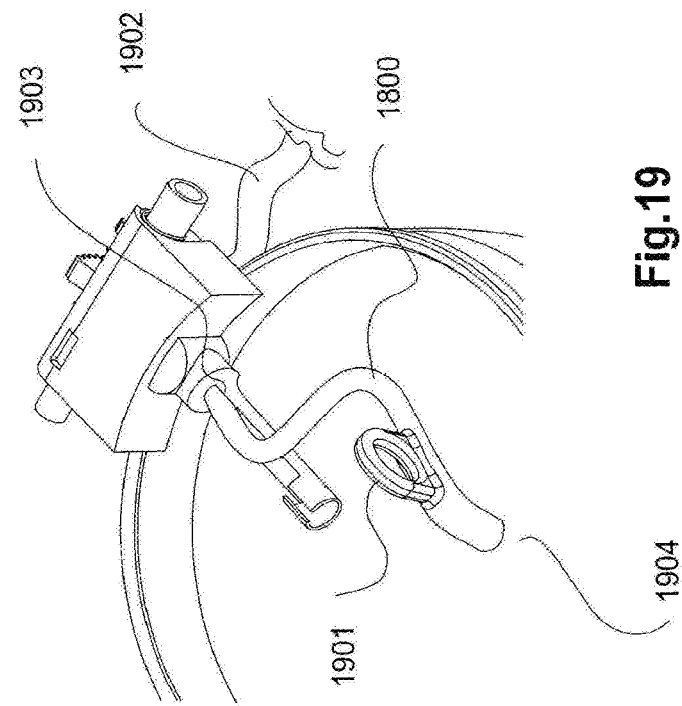
FIG. 19 is a perspective view of a showerhead that can be manipulated by a user.
Figure 18:
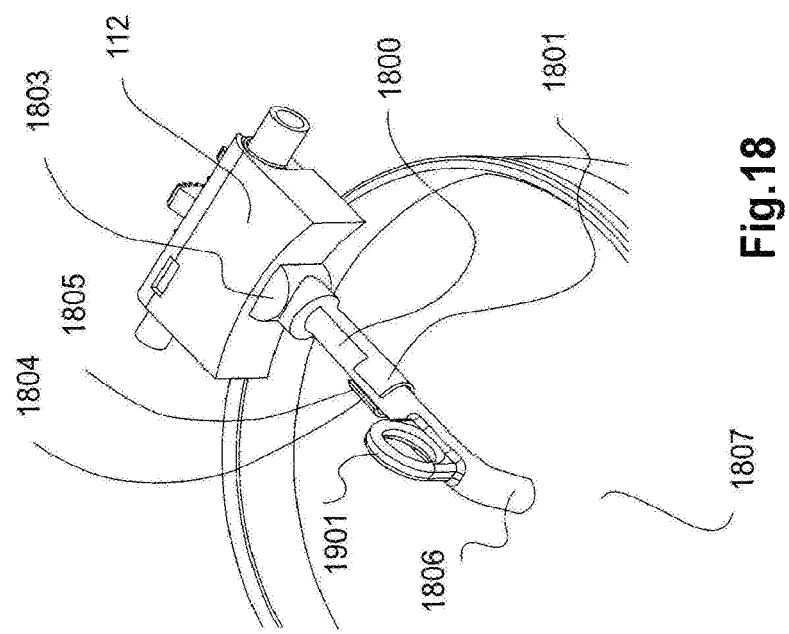
FIG. 18 is a perspective view of a showerhead that can be manipulated by a user.

In the example of FIG. 18, the conduit 1800 that supplies hot water to the interior of the filter basket may be flexible hose that irremovably retained and supported by a brace 1801. The brace 1801 may be affixed to the hinge assembly 112 or to an interior of the filter basket. The hose 1800 may be carried by a pivoting joint 1803 of the kind depicted in FIG. 16. In this example, one end of the brace 1801 comprises a resilient clip having an opening 1805 that allows the conduit 1800 to pass through it in both directions as suggested by FIG. 19. In this example, the flexible conduit 1800 terminates in a simple open end 1806. However, the end of the conduit 1806 can removably retain a showerhead 1807. As suggested by FIG. 19, the flexible conduit 1800 can be removed from the brace 1801 and grasped by its handle 1901 so that its discharge can be distributed about the interior of the filter basket. In some embodiments, slack or additional conduit 1902 can be pulled through an opening 1903 so as to lengthen the distance between the terminal end of the conduit 1800 or the place through which it enters the filter basket 113. When returning the conduit 1800 to the position depicted in FIG. 18, a slack conduit is pushed through the opening 1903. In the example of FIG. 19, the conduit 1800 terminates in a permanent spray head or showerhead 1904 although it will be appreciated that the conduit can have either no showerhead or a removable one as suggested by FIG. 18.

Figure 20:
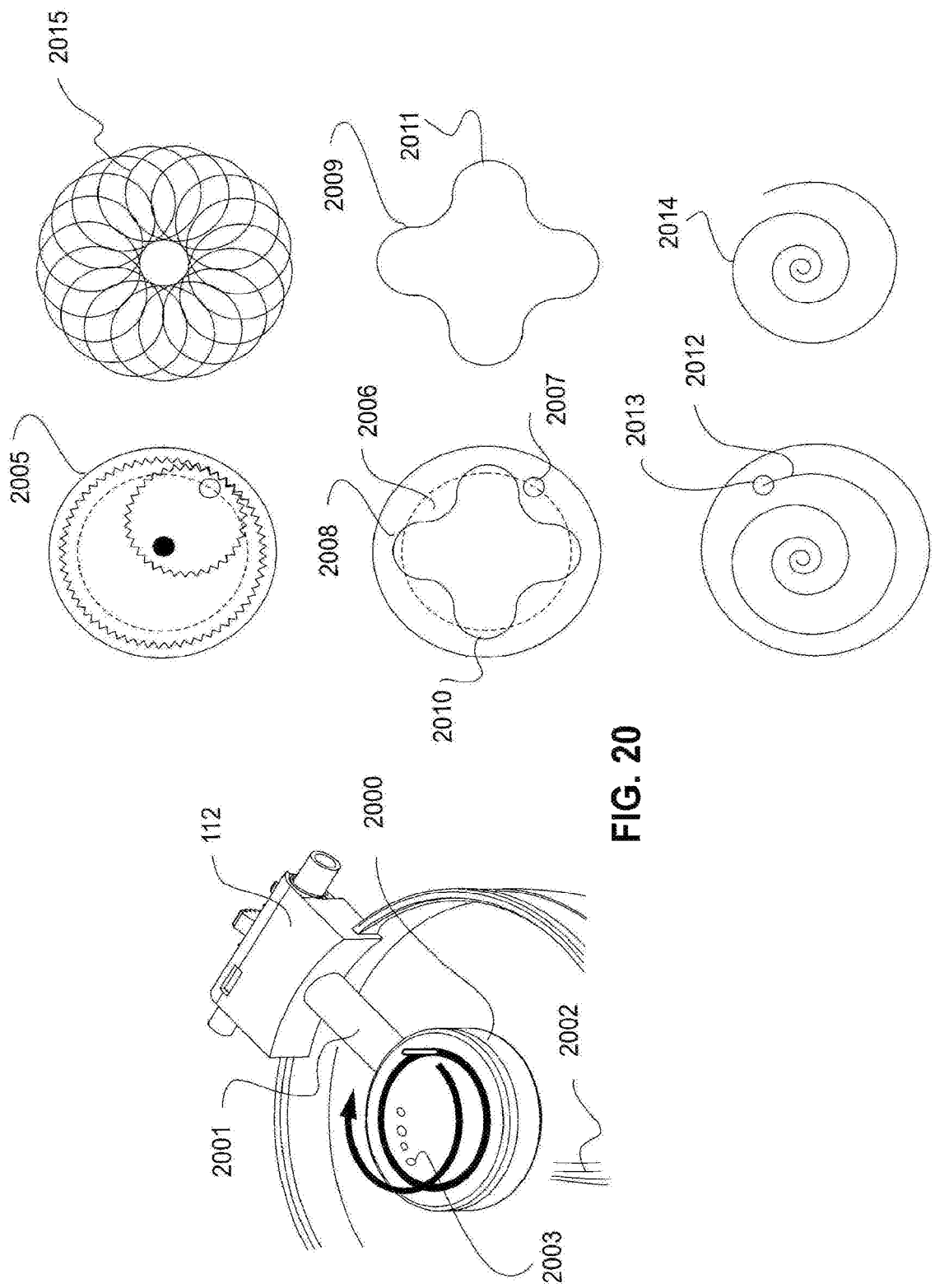
FIG. 20 illustrates patterns of movement for a self-powered showerhead.

As shown in FIG. 20, the showerhead 2000 can be fixed to the hinge assembly 112 or to the filter basket by a rigid (or other) conduit 2001 and still provide a dynamic or moving spray pattern 2002 through the plurality of openings 2003 formed through the underside of the showerhead 2000. This can be achieved, for example, by the showerhead incorporating an internal flow powered mechanism for altering the flow pattern or intensity, such mechanisms being common in domestic bathroom "massage" style showerheads provided by products sold under the brand WATERPICK®. and DELTA®. Accordingly, the showerhead 2000 may incorporate an internal water driven planetary gear arrangement 2005 where epicyclic motion of the gears provides an epicyclic movement 2015 of the entire discharge pattern. Similarly the showerhead may have a moving discharge head 2006 having a follower 2007 that is retained in a track 2008 thus providing a water discharge pattern that follows a shape 2009 that corresponds to the shape of the track 2008. In this example, the track has four lobes 2010 thus providing a moving spray pattern also having four lobes 2011. In other examples, the track may be in the form of a spiral 2012, the action of the follower 2013 in the track 2012 providing a moving spray pattern in the shape of a spiral 2014.

Figure 21:
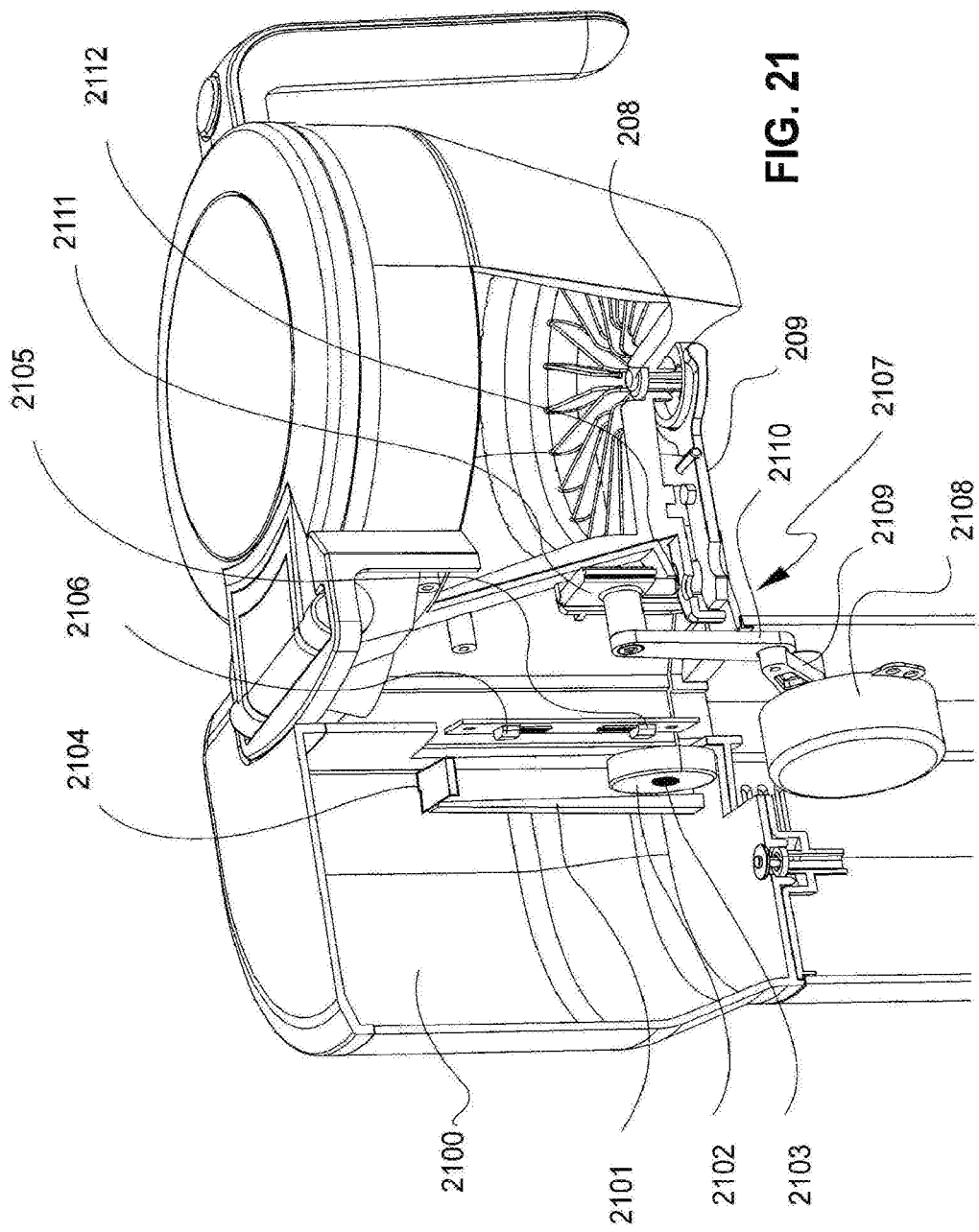
FIG. 21 is a perspective view, partially cross-sectioned, of drip-stop valve actuator and level sensing mechanism.

As shown in FIG. 21, a preferred example of the invention utilizes a removable water reservoir 2100 in which is located components of a water level sensing mechanism 2101. In this example, the level sensing mechanism comprises a disk like float 2102 within which is located a magnet 2103. The float 2102 is trapped within a guide or case 2104 that restricts the motion of the float to a generally vertical reciprocation as the water level within the reservoir rises and falls. The magnet 2103 interacts with, for example, two or more magnetic sensors located in the neck area 110 (or otherwise), being (for example) a lower sensor 2105 and an upper sensor 2106. Both sensors communicate with the device's processor 107 for the purpose of establishing how much water the user has added to the reservoir 2100. The location of the lower sensor 2105 corresponds to a water volume or water level in the reservoir that represents a small serving of, say, 1-4 cups. The upper sensor 2106 represents a water level or water volume corresponding to, for example, 5-12 cups. When water is added to the reservoir and only the lower sensor 2105 is activated by the magnet 2103, the instructions or signal provided by the lower sensor 2105 to the processor cause the processor to engage the "single serve" mechanism 2107. In this example, the single serve mechanism comprises a small electronic motor such as a synchronous or other motor 1208 that rotates a lever or intermediate actuator 1209. The lever 2109 is pivotally attached to a link 2110 that raises and lowers an actuator 2111 (215 in FIG. 2). The actuator 2111 has, for example, a pin 2112 that can be driven into engagement with the drip-stop valve's lever 209 for the purpose of lifting and thereby actuating the drip-stop valve 208. The protective shroud 218 preferably has an opening 217 to allow the actuator's tip 2112 to act on the lever 209 and thereafter be withdrawn.

If the water level in the reservoir is enough to lift the float 2102 so that its magnet 2103 activates the upper sensor 2106, then the signal sent by the sensor 2106 to the processor 107 causes the processor to revert to a default brew mode whereby the drip-stop valve 221 is elevated or activated in the normal way, without delay. Delay in the action of the actuator 2111 allows the water to remain in contact with the coffee grounds in the filter basket longer and thereby improve the brew quality of small servings such as single servings e.g. that are less than the threshold volume required to trip the upper sensor 2106.

As shown in FIGS. 1 and 22, the lid 2200 of the carafe 101 comprises a polymeric chassis having a generally circular upper rim 2201. The upper surface of the lid 2200 features an upper raised surface 2202 having an outer surrounding portion 2203 and an inner portion 2204. The upper surfaces of the inner and outer portions 2203, 2204 maybe either flush or sharing a common curvature. Between the inner and outer portions, the upper web of the lid forms a channel that separates thinner and outer raised portions 2203, 2204. The channel receives a pivoting pouring or lid lever 2206. In this example, the lid lever 2206 is roughly torroidal or in the shape of an "O", having an inner edge 2207 that conforms to the shape of the inner portion 2204 and an outer edge 2208 that conforms to the curvature of the outer portion 2203. The lid lever 2206 has a central opening that receives the inner portion 2204. The upper surface of the lid lever 2206 is flush with the edges of thinner and outer lid portions 2203, 2204 when in the sealing or closed position shown in FIG. 22. The lid lever 2206 is biased into the closed position by a compression spring or other means 2214 concealed below the lid lever 2206, preferably below a thumb rest 2209 that extends radially outward from the generally circular outer edge 2208 of the lid lever. Because the lid pivots, the action of the spring 2214 acts to urge the primary lid seal 2210 into engagement with a vertical passageway 2211 that extends from an under-surface 2212 of the lid to the lid's spout 2213. The seal 2210 is preferably a soft polymeric material that is affixed to an underside of the lid lever 2206. When the thumb platform or thumb rest 2209 is depressed against the bias of the spring 2214, the seal 2210 moves away from the passageway 2211 as suggested by FIG. 23.

As shown in FIG. 23, the lid has a vertical breather port 2300 that is in this example located centrally of the compression spring 2214 and below the thumb lever 2209 so as to conceal it. The breather port 2300 has, at an upper extent, a one-way air flow valve or "umbrella" valve that admits air into the interior of the carafe 101, as required. In preferred embodiments, the lid assembly 2200 incorporates a sealed air pocket or insulating sub-assembly 2302. The insulating air pocket sub-assembly 2302 has a central opening 2303 that fits around the carafe's brew through valve 2304. In this example, the sub assembly 2302 has lower compartment 2305 that is sealed by a cover 2306 that is ultrasonically welded to it. The sealed sub-assembly 2302 is inserted into a circular pocket 2307 formed on the underside of the lid. The sub-assembly 2302 is thereafter (for example) ultrasonically welded into the pocket 2307. This creates two separate air chambers 2308, 2309 that are separated by the cover 2306. The cover 2306 may be omitted if only a single air chamber is required. The one or both air chambers 2308, 2309 help thermally insulate the contents of the carafe from the environment outside the carafe.

The brew through valve 2304 comprises a vertical tube 2310 through which brewed coffee flows from the appliance's drip-stop valve or dispenser through to the interior of the carafe when the valve is depressed or disengaged. The upper part of the vertical tube 2310 forms a funnel shaped actuator 2311 that is adapted to interact with the drip-stop valve and lift it into a dispensing position when the carafe is inserted below the filter basket. The outer rim 2312 of the actuator 2311 fits within the inner rim of the inner portion 2204 of the lid. A compression spring 2313 biases the valve 2304 upwardly so as to seal the valve. The valve is sealed against an underside of the lid with a polymeric seal 2314 that is attached to a lower part of the valve 2304. When the actuator is depressed by the head of the drip-stop valve, the seal 2314 is moved away from the underside of the lid so that coffee can flow into the interior of the carafe.

In this example, the lid has a pouring spout 2320, the upper surface of which features an array of optional parallel upright fins 2321. These fins interdigitate with downwardly directed fins 2322 formed on an underside of the spout covering portion 2323 that projects from the lid lever.

Figure 24:
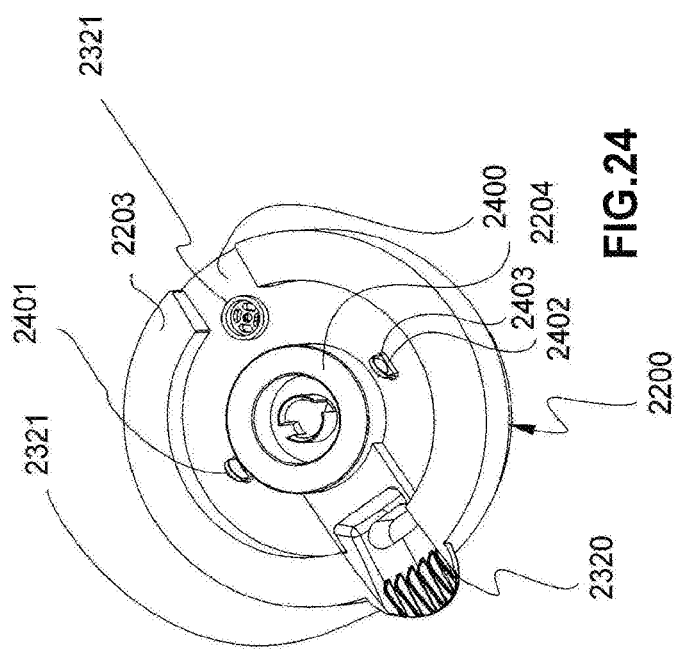
FIG. 24 is a perspective view of a lid for a carafe, the lever having been removed.

As shown in FIG. 24, the upper surface of the lid's chassis features a gap 2400 in the raised outer portion 2203. The gap is adapted to receive the thumb rest 2209. The breather 2301 is shown as being located in radial alignment with the gap 2400. The upper surface of the lid chassis also has, in the channel that separates the inner and outer raised portions 2203, 2204, a pair of pivot components such as pivot ears 2401, 2042. Each ear comprises a tab that is elevated from the floor of the channel and includes a rounded, outward facing protrusion 2403.

Figure 25:
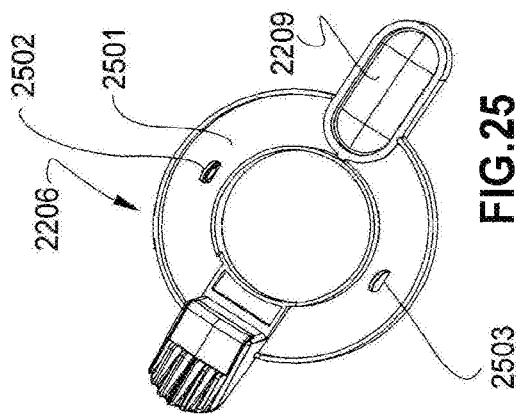
FIG. 25 is perspective view of a lever for the lid depicted in FIG. 24.
Figure 26:
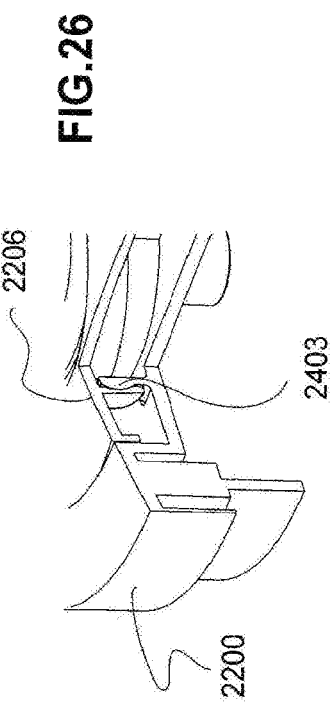
FIG. 26 is a perspective view, partially cross-sectioned to illustrate the attachment of the lever to the lid.

As shown in FIGS. 25 and 26, the underside 2501 of the pivoting lever 2206 has a pair of pivot ears 2502, 2503. The lever's ears each have inward facing depressions or concavities that cooperate with the protrusions on the pivot ears on the lid's chassis 2401, 2402. This removable engagement between the lid's lever 2206 and the lid chassis is shown in FIG. 26. This arrangement allows the thumb rest 2209 to open and close the spout seal 2210 and yet be easily removable and replaceable for cleaning.

Figure 27:
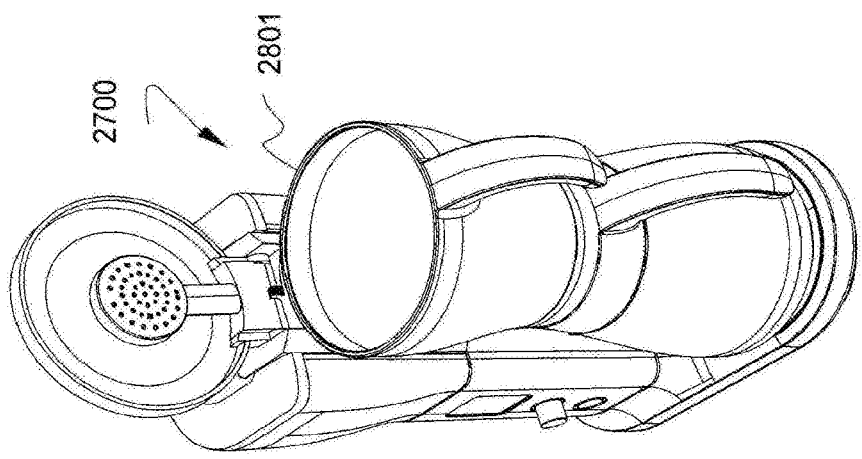
FIG. 27 is a perspective view of a drip filter coffee machine.
Figure 28:
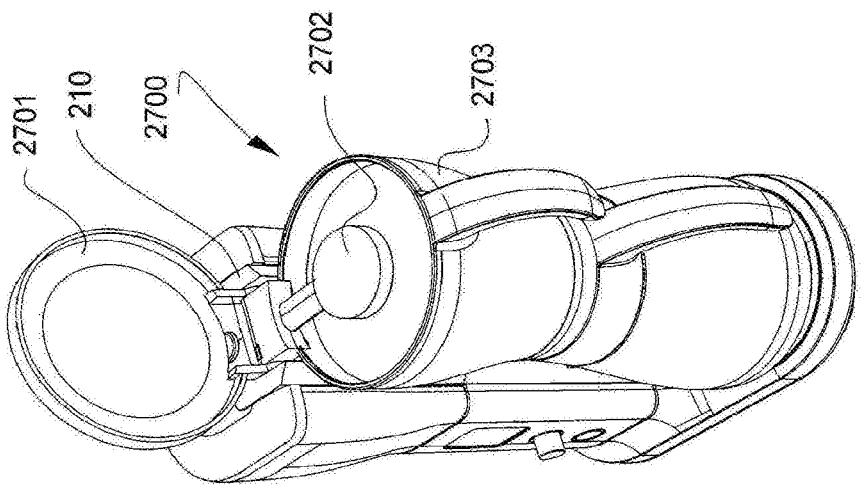
FIG. 28 is a perspective view of a drip filter coffee machine.

As shown in FIG. 27, the technology of the previous embodiments can be applied to a coffee making appliance 2700 where the filter basket's lid 2701 and pivoting or otherwise adjustable showerhead 2702 are supported by the neck 110 of the device rather than being pivotally supported by the filter basket 2703. As shown in FIGS. 27 and 28, this allows the appliance to brew coffee grounds in the filter basket 2703 either by utilizing the showerhead 2702 or by any of the aforementioned pour over methods, these being compatible with an unobstructed filter basket opening 2801 as shown in FIG. 28.

As shown in FIG. 29, the showerhead 2702 is affixed to a hollow hinge block 2901 by a supply conduit 2902. The conduit may be constructed in accordance with any of the aforementioned examples. The hinge block 2901 receives a hollow hinge shaft 2903. One end 2904 of this shaft 2903 is encircled by a coil spring or other biasing means 2905 that acts to pivot the showerhead and the lid into the upright orientation. The other end of the hinge shaft 2903 comprises a tube or hollow fitting 2906 that protrudes through an opening 2907 in the hinge block 2901 and receives the end of the tube 2908 that supplies water to the showerhead 2702. Water entering the shaft 2903 from the fitting 2906 is diverted through to a slot or opening that is a dispensing port 2909 and that aligns with an opening in the conduit 2902 when the showerhead is in a dispensing orientation. When the showerhead 2702 is pivoted upward, the dispensing port 2909 is blocked. In this example, the hinge block 2901 carries a toothed, arcuate gear segment 2910 that cooperates with a pinion gear 2911 on a rotary damper 2912, the rotary damper 2912 regulates the spring loaded opening of the showerhead and lid thereby reducing both the acceleration and velocity of the showerhead 2702. This minimizes unnecessary splashing of water from the showerhead as it is being opened.

As suggested by FIGS. 29 and 30, the hollow hinge shaft 2903 also has a discharge port 2913, preferably located diametrically opposite the dispensing port 2909. As shown more clearly in FIG. 30, the discharge port 2913 is blocked by the body of the hinge block 2901 when the showerhead 2702 is in a water dispensing orientation. In this configuration, the dispensing port 2909 discharges into the conduit 2902 and passes into the showerhead 2702. This is shown in FIG. 31. However, when the showerhead and its conduit are raised to clear the opening of the filter basket, the dispensing port 2909 is blocked by the hinge block 2901 and the discharge port 2913 discharges into a drain 3201 and not into the showerhead. The position of the hinge block 2901, the conduit 2902 or the showerhead 2702 may be monitored by a sensor or switch 3202. The sensor or switch 3202 can provide a switching state or signal to the device's microprocessor which would prevent the appliance's pump from supplying water into the supply tube 2908 when the showerhead is in an upright orientation.

Figure 33:
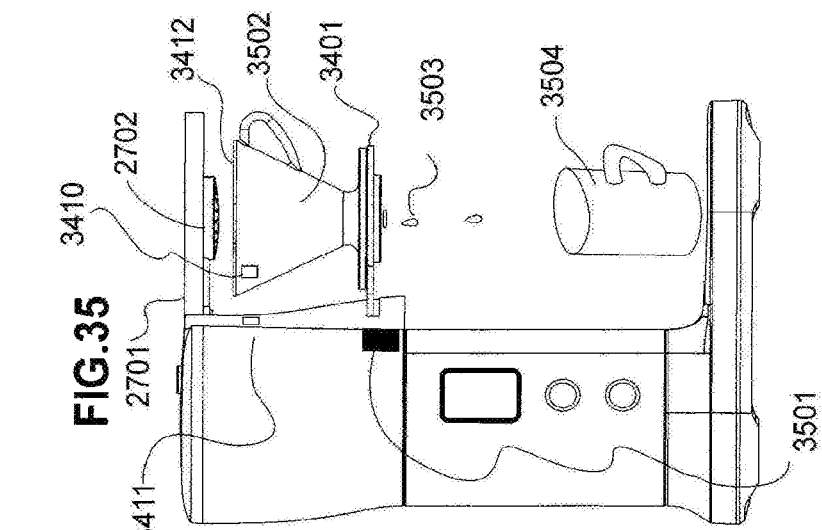
FIG. 33 is a side elevation of a drip filter coffee machine with moveable platform.
Figure 34:
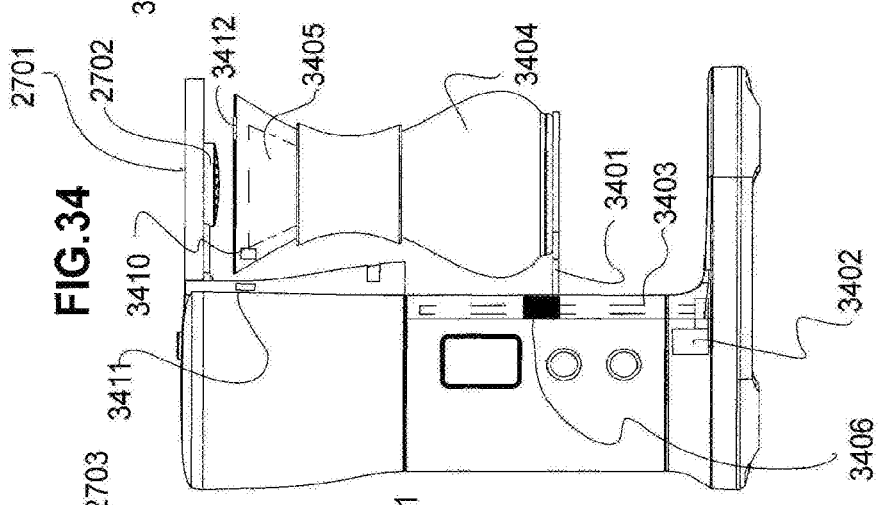
FIG. 34 is a side elevation of a drip filter coffee machine with moveable platform.
Figure 35:
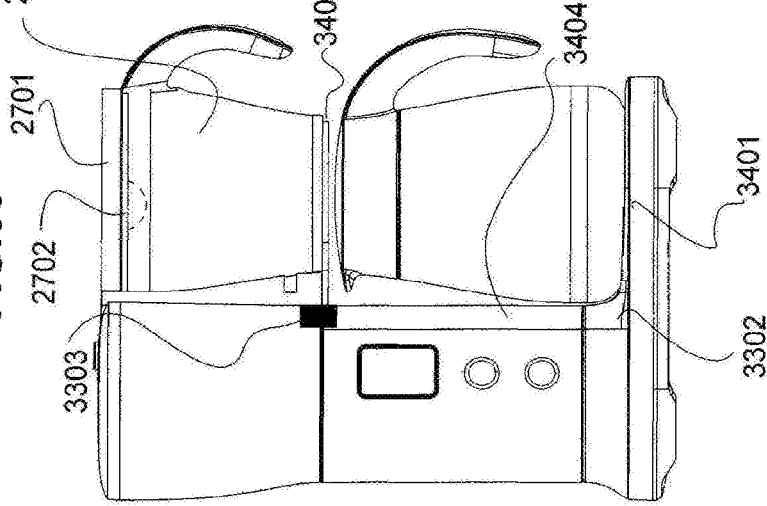
FIG. 35 is a side elevation of a drip filter coffee machine with immovable platform.

As shown in FIGS. 33, 34 and 35, by having the filter basket's lid 2701 and the showerhead 2702 pivotally cantilevered from the body of the appliance, particularly the neck area, the appliance is capable of discharging heated brew water into a variety of different receptacles. As shown in FIG. 33, the showerhead 2702 is adapted to discharge directly into the filter basket 2703. The appliance may also be provided with a movable elevator or platform 3401 that is raised and lowered manually or by a processor controlled electric motor 3402. The motor 3402 can drive, for example, a screw or belt driven conveyer 3403 that cooperates with the platform 3401. Slots, guides or tracks 3304 may be used to control the position of a manually operated platform 3401. One or more micro-switches which are in proximity with the platform's path can convey information about the location of the platform 3401 to the processor. In the example of FIG. 33, the platform is either fully lowered (lying beneath the carafe) or fully raised and located directly below the filter basket 2703. A first sensor or micro-switch 3302 or 3303 communicates with the processor 107 to communicate the location of the platform 3401 to the processor. As shown in FIG. 34, the platform 3401 may have second position for receiving, for example, a Chemex® carafe 3404 adapted to contain its own style filter 3405. A second micro-switch or sensor 3406 mounted on the body of the machine detects the second position of the platform 3401. As shown in FIG. 35, the platform 3401 can have a third position that is more elevated than either the first or the second position. The third position is detected by a third micro-switch or sensor 3501 that communicates with a processor in the manner previously described. In the third position, the platform can support a filter container such as a Hario® type filter container 3502. An opening in the center of the platform 3401 allows the container 3502 to discharge 3503 through the platform 3401 into a container 3504 located below the platform 3401. In preferred embodiments, the processor uses the location information received by the switches or sensors 3302, 3303, 3406, 3501 to alter parameters, processes and process limits associated with coffee brewing. Selected parameters include, for example, flow rate, brew water temperature, maximum discharge volume or the discharge pattern of the showerhead 2702.

As shown in FIGS. 34 and 35, a brewing vessel or accessory 3404, 3502 can incorporate a data tag, barcode or transponder 3410 that can wirelessly communicate identification data to an adjacent receiver, detector or reader 3411. In some embodiments, the receiver 3411 is located in the neck area or otherwise adjacent to the upper rim 3412 of the container. The identification information that is specific to the container is transmitted to the device's processor 107 and can be used by the processor to determine process parameters associated with the individual vessel.

Figure 36:
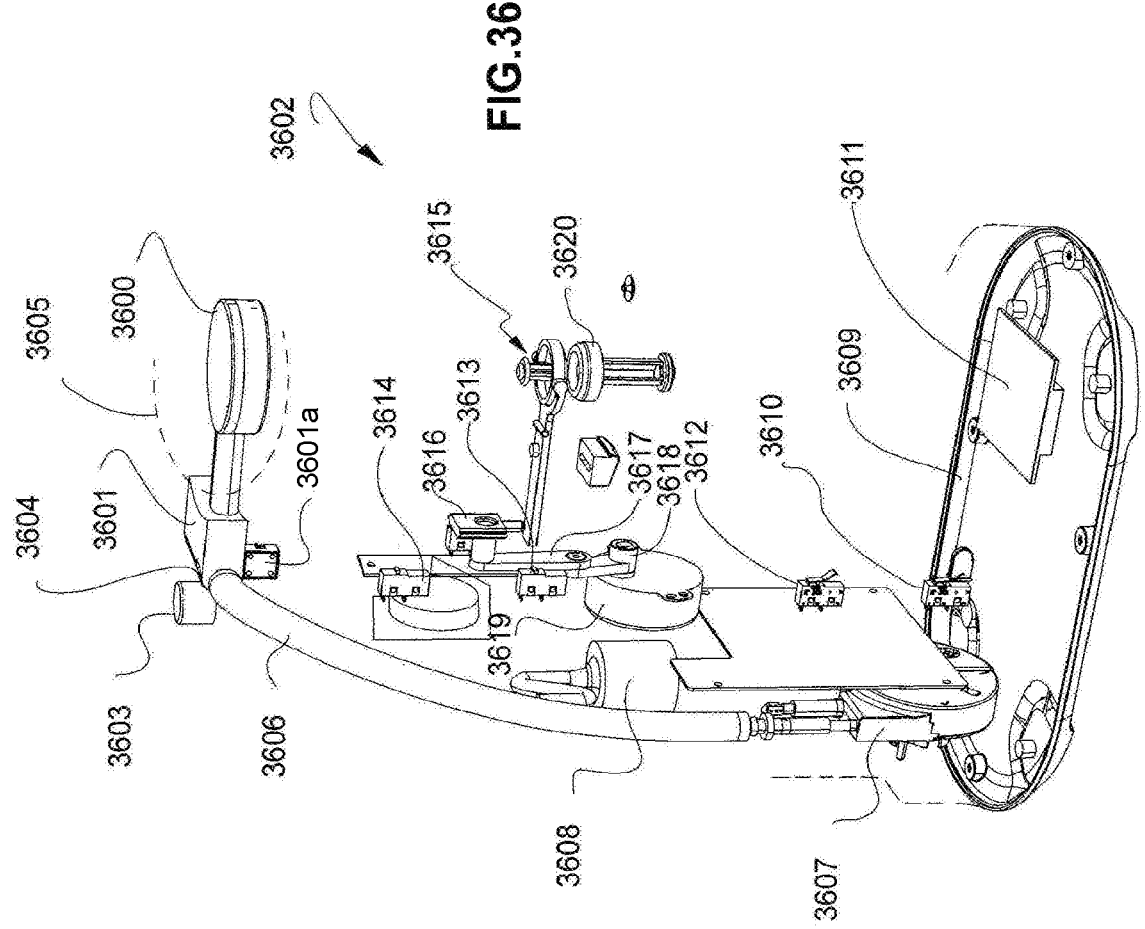
FIG. 36 is a perspective view of a drip filter coffee machine with the external cover removed to illustrate internal components of the device.

FIG. 36 illustrates some of the internal components associated with a coffee making appliance of the type suggested by FIGS. 27-35. In this embodiment, the showerhead 3600 and its hinge block 3601 are mounted directly to the body or chassis of the appliance 3602 overhanging the base. The rotating motion of the showerhead 3600 is governed by a rotating damper 3601a that cooperates with the hinge block 3601. A mechanical push button 3603 operates a latch mechanism 3604 that retains and selectively opens the lid 3605 and the showerhead 3600. The showerhead 3600 receives brew water from a supply tube 3606 that extends from the appliance's thermoblock heater 3607. The flow into the heater is provided by a solenoid pump 3608 that draws from the water reservoir. The base 3609 incorporates a carafe interlock switch 3610 that provides carafe location information to the device's processor. The base also incorporates a heating element such as a PTC element 3611 that is also controlled by the device's processor. An array of vertically displayed switches or sensors 3612, 3613, 3614 provide location information to the processor regarding the vertical elevation of the platform 3401. The filter basket's drip-stop valve 3615 is operated by an actuator 3616 that is located within the body of the appliance. The actuator 3616 is, in this example, activated by a reciprocating link 3617 that is driven by a crank 3618 that is rotated by an electric motor 3619 located within the body. The drip-stop valve 3615 can also be actuated by the carafe's brewthrough valve 3620.

Figure 37:
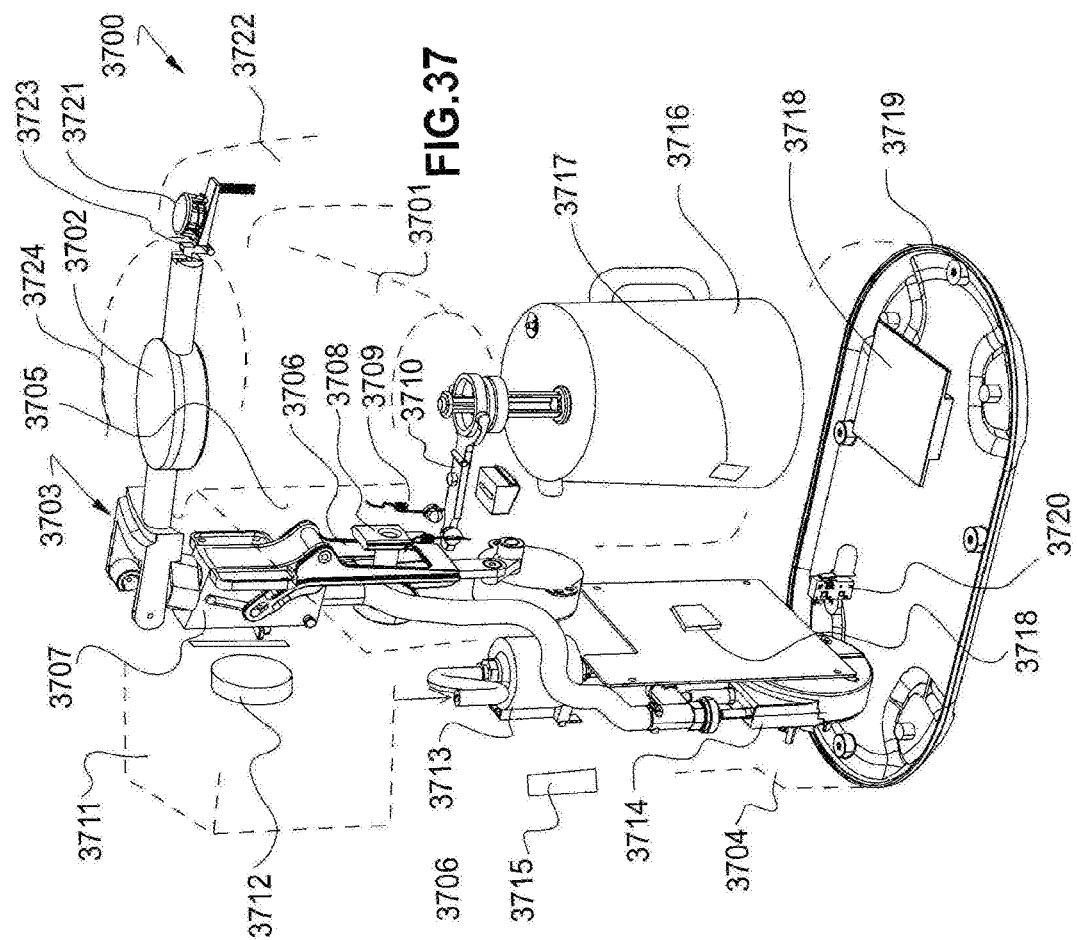
FIG. 37 is a perspective view of a drip filter coffee machine with the external cover removed to illustrate internal components of the device.

An example of a drip filter coffee making appliance 3700 having a removable filter basket with a built-in or integral showerhead assembly 3702 is depicted in FIG. 37. As illustrated, the filter basket 3701 has a hinge assembly 3703 that permits the filter basket 3701 together with the hinge assembly 3703 and showerhead 3702 to be disengaged from the main body 3704 of the appliance. The neck area 3705, being that portion of the body 3704 that extends between the body and the filter basket 3701 is shown as containing the basket interlock mechanism including the basket interlock lever 3706, the reciprocating coupling 3707, the actuator 3708 and the detents 3709 that removably engage the actuation lever 3710 of the filter basket. The removable water reservoir 3711 and its internal floating transponder 3712 are located above a solenoid pump 3713 that draws water from the reservoir 3711 and supplies it to a thermoblock heater 3714. The solenoid (or other style) pump 3713 and the thermos blockheater 3714 are independently controlled by the device's processor 3715. The processor 3715 is able to adjust the delivery rate or flow rate of the solenoid pump 3713 for a variety of different purposes. For example, a user may wish to adjust the delivery rate of the pump 3713 from the user interface 106 for the purpose of adjusting the characteristics of the brewing process. The processor can independently govern the flow rate of the pump 3713, upon, for example, detecting a particular style of carafe or receiving container 3716. The carafe, vessel or container 3716 may have integrated into it a transponder or RFID tag or barcode 3717 that can be detected or read by a sensor or receiver 3718 located within the appliance's body 3704. The identification information received by the processor 3715 from the sensor, reader or detector 3718 can be used by the processor to limit the delivery volume, alter the flow rate from the pump 3713 or regulate the operation of the thermoblock heater 3714. For example, in a cold drip brewing operation, the processor 3715 can turn the thermoblock heater 3714 off so that only cold water is delivered to the showerhead 3702.

Prior art coffee machines are unable to brew cold drip coffee because water is delivered to the filter basket by, for example, the thermoblock type water heater. The thermoblock uses thermal expansion to propel water to the showerhead. Because cold drip style coffee requires cold water, the use of the thermoblock heater is unsuitable. The present device, in preferred embodiments, uses a solenoid pump which can be driven intermittently to produce low enough average flow rates to brew even small servings of coffee over a period of hours. By using menus or pre-set functions available through the user interface 106, the user can disable the device's heater and specify a brew time consistent with cold drip techniques. The processor 107 determines the cycling action of the solenoid pump to provide a resultant flow rate to satisfy the user specified brew time. In preferred embodiments, the user either specifies the brew volume or the volume is determined by the level sensor in the reservoir. The processor may then use brew volume in conjunction with the brew time to determine the flow rate characteristics of the pump.

The presence of an insulated carafe 3716 may cause the processor 3715 to deactivate the warming element 3718a located in the base 3719. In the alternative, a switch such as a micro-switch 3720 located in or adjacent to the base 3719 can mechanically detect the presence of a carafe 3716 and transmit switching information or relevant data signal to the processor 3715 so that processing parameters can be determined by the processor in view of the received information.

FIG. 37 also illustrates the mechanical push button 3721 located at the upper extent of the filter basket's handle 3722 and how it can be thumb activated to disable a latch 3723 that retains the filter basket's lid 3724 and showerhead 3702.

It will be appreciated that the hinge assembly 3703 depicted in FIG. 37 is removable from the body of the appliance utilizing, for example, the hinge assembly depicted in FIGS. 2-13.

Figure 38:
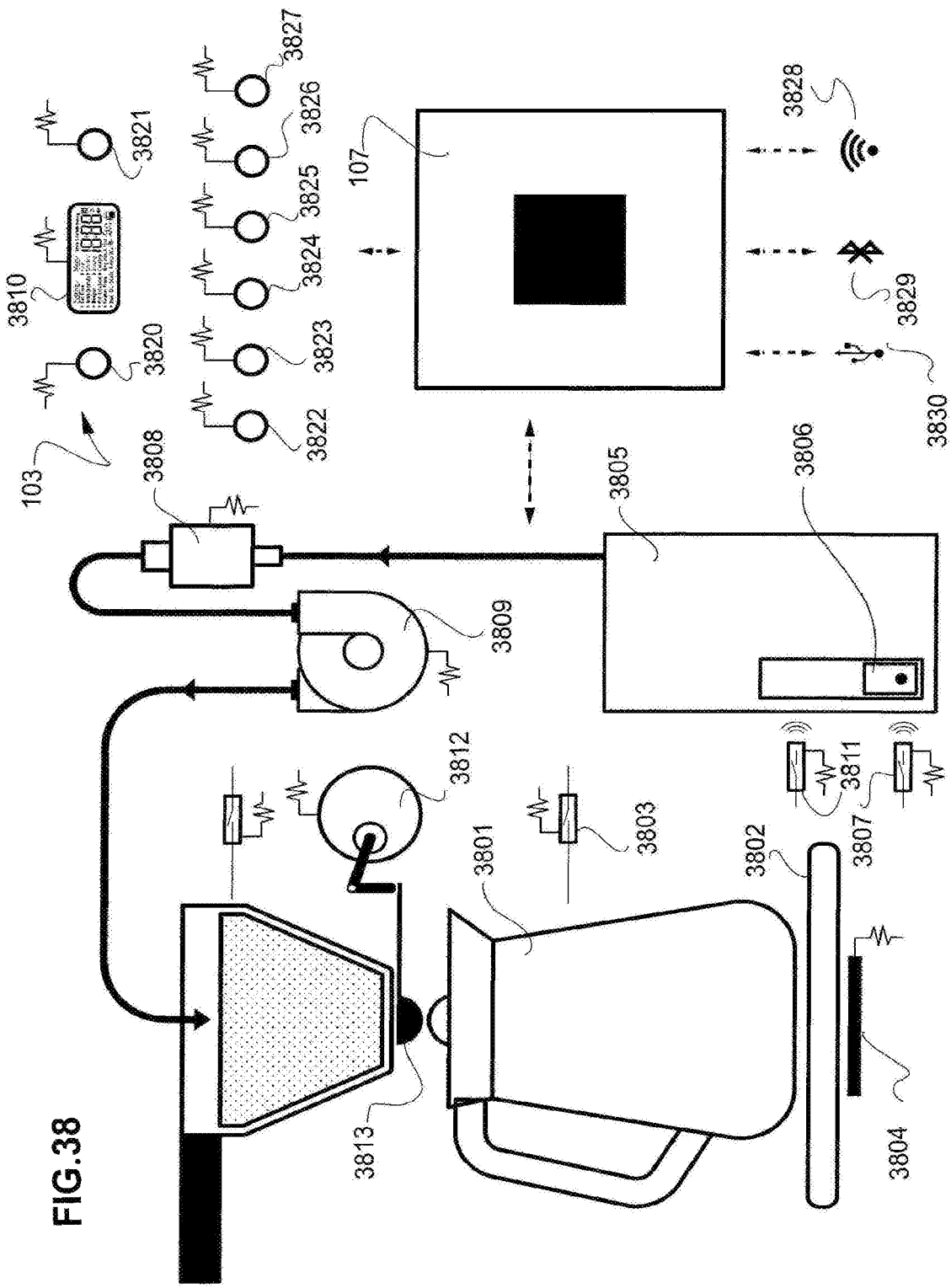
FIG. 38 is a schematic diagram of a drip filter coffee making appliance.

As shown in the example of FIG. 38, the device's microprocessor control unit or processor 107 receives inputs from the accessible user interface 106 and various switches or sensors that are located throughout the device. In this example, a user places an uninsulated carafe 3801 on the appliance's base 3802. The carafe 3801 is shaped or configured to cooperate with a sensor or micro-switch 3803. The carafe 3801 is shaped or configured so that it interacts with the sensor or switch 3803 whereas an insulated carafe would not interact with the sensor or switch 3803. The interaction between the carafe and the switch 3803 is detected by the microprocessor 107. This causes the microprocessor 107 to defeat, turnoff or not activate the PTC warming element 3804. After the user adds a predetermined dose volume of water to the reservoir 3805, the level sensors detect the rise of the float and its magnet or transponder 3806. Where the level in the reservoir is inadequate for even a single serve, first sensor 3807 may communicate with the processor 107. The processor responds by not allowing the pump 3808 or thermoblock heater 3809 to be activated. A "low level" warning may also be displayed on the interface's graphic display 3810. A second sensor 3811 detects a rise in the transducer 3806 corresponding to a small serving or a single serving (1-4 cups). The interaction between the transducer 3806 and the second sensor 3811 is detected by the processor 107. This causes the processor 107 to control the motor or servo 3812 that controls the filter basket's drip-stop valve 3813 to delay the opening of the drip-stop valve until the grounds in the filter basket are pre-infused or bloomed for a sufficient duration. Thereafter the processor causes the motor or servo 3812 to open the drip-stop valve 3813 so that coffee is dispensed into the carafe 3801. In some embodiments, irrespective of coffee dose, the processor may cause the pump and thermoblock heater 3808, 3809 to discharge a volume of water that is not sufficient to submerge the coffee and is discharged at a rate that ensures maximum wetting of the coffee grounds in the filter basket while not allowing the grounds to rise to the surface of water that accumulates at the bottom of the filter. This initial, gradual wetting causes the coffee grounds to swell or bloom. The pre-infusion or bloom discharge, prior to the main or remaining discharge of water into the filter basket, is determined by the processor based on the actual or assumed volume of coffee in the filter basket, the volume of water that the user has placed in the reservoir and other parameters including user preferences, the coarseness of the grounds and the temperature of the water discharged into the filter basket.

In the example of FIG. 38, the user interface 106 includes a graphic alphanumeric display or touch screen 3810, a rotary encoder 3820, by which the user can make menu based selections from the graphic based interface 3810 and a combined start/pause/off push button 3821. When the appliance is running, pressing the pause button 3821 causes the processor to cease the operation of (at least) the pump 3808 and the thermoblock heater 3809. The processor may also cause an alert such as "pause" to be displayed on the graphic display 3810. Pressing the pause button again causes a resumption of the process that was paused. This may require a preheating of the thermoblock heater 3809 prior to the inception of the remainder of the selected program. When the start/pause/hold button is depressed and held for a pre-established duration, the processor switches the appliance off.

The user interface 106 may also include individual controllers, switches or buttons for communicating specific functions to the processor 107. For example, one dedicated switch 3822 causes the processor to turn the heater 3809 off. Another button 3823 causes the processor to turn the pump 3809 off. Another button 3824 causes the processor to toggle the operation of the drip-stop valve 3813 between open and closed. Another dedicated button 3825 may cause the processor to run a pre-infusion program whereby a small amount of water is added to the filter basket and the drip-stop valve is maintained in the closed position for the duration of the pre-infusion. Another dedicated button 3826 causes the processor 107 to initiate a "cold drip" program comprising use of the pump 3808 without the heater 3809 to discharge small volumes of water over a period of time extending over hours. Another button 3827 communicates with the processor 107 and is interpreted as an instruction to commence two-way communication with a remote data stream originating from, for example, a wireless communication protocol commonly referred to by the trademark WIFI enabled device 3828, a personal area networking protocol commonly referred to by the trademark Bluetooth enabled device 3829 or an interface that allows computers to communicate with peripherals commonly referred to by the trademark USB enabled device 3830.

The device's pump, for example the processor controlled solenoid pump 3808, 3608 or heater 3916, or warming element 3918 or drip-stop valve actuator 3917 can be automatically controlled or adjusted by the device's processor 107 in a number of ways as suggested by FIG. 39. A user can for example use controls on the device's interface 106 to enter a pump adjustment menu provided by the processor. From that menu, the user can adjust the pump's operational parameters such as rate for one specific program or for all relevant programs that the device performs. Some programs may by necessity ignore the user adjustment of the pump's rate where user adjustment is appropriate or where the user entered value is incompatible with a selected program or process. The user selected pump parameter or parameters may be saved by the processor and used in subsequent programs. Embodiments of the invention that utilize a moveable platform 3401 as shown in FIGS. 33-35 can use data from the platform location sensors (3612, 3613, 3614 in FIG. 36) exemplified by item 3902, to communicate with the processor 107 and thereby alter the pump's delivery rate and other parameters as required to take into account the type of vessel supported by the moving moveable platform 3401.

An identifier such as a barcode, or RFID tag or other transponder 3410 that is carried by a basket insert or adaptor 3903 (see FIG. 14) communicates with a sensor or reader located within the body of the appliance 3911 can cause the processor 107 to change the pump's delivery rate or other parameters to suit the particular insert 3903, its volume and dispensing characteristics. In other examples, a remote device 3912 can transmit information to the processor 107 by any conventional means including an interface that allows computers to communicate with peripherals commonly referred to by the trademark USB 3913, a personal area networking protocol commonly referred to by the trademark Bluetooth 3914 or a wireless communication protocol commonly referred to by the trademark WIFI 3915 interface to allow user adjustment of e.g. pump rate for one or all programs for which these kinds of alterations are permissible. User initiated alterations to the pump's delivery rate may be saved by the processor and used in subsequent operations. It will be appreciated that in the aforementioned examples of FIG. 39 that the various input devices 106, 3902, 3410, 3912 that interact with the processor to cause changes in the delivery rate of the pump 3901 may also be used to instruct the processor 107 to alter the characteristics of the device's heater 3916, such as its target temperature or on/off state. Similarly, these same methodologies and hardware configurations may be used so that the processor 107 can control the appliance's drip-stop valve actuator assembly 3917. The components of the drip-stop valve actuator assembly 2108, 2109, 2110, 2111, 209 as shown in FIG. 21). It will be understood that other forms of actuating the drip-stop valve and other mechanical arrangements of drip-stop valve are within the scope of the present invention. The devices warming element 3918 may be controlled in this same way, as outlined above.

As shown in FIG. 40, the activity of a coffee making appliance of the type previously disclosed can be expressed as a brewing profile 4000. A brewing profile can be expressed as a data file that can be stored, shared or edited. A part of the brewing profile is represented graphically and illustrates the processor control over the pump and heater that result in changes in the delivery pump's flow rate 4001 as a function of time. In this example, the flow rate component of the profile is illustrated as starting at the beginning of the coffee making cycle or program 4010 and illustrates by way of example a pump rate of 5 ml/s 4003 until the detected volume of dispensed liquid is, for example, 50 ml 4004. The volume dispensed may be measured in many known ways. The pump is then stopped. The water dispensed up until this point has been heated to 91 C by the devices heater. In this example, the drip-stop valve has been held closed for a lapsed time of sixty seconds 4005 since the beginning of the cycle. After the drip-stop valve is opened 4005, the pump discharges at 3 ml/s 4006 until a volume of 200 ml has been dispensed at e.g. a showerhead temperature 94 C. After the end of this segment of the program 4007 the pump's flow rate is increased by the processor to 5 ml/s 4008 until all the water of the reservoir has been discharged 4009. This final profile segment delivers water at a showerhead temperature of e.g. 94 C. Thus the aforementioned brewing profile example comprises sub-segments having individualized flow, temperature and volume parameters that operate in sequence from the beginning to the end of a brew cycle and result in a brew delivered to the user in accordance with preprogrammed or user modified instructions.

As shown in FIG. 41, a brewing profile or a portion of the profile or a modified profile can be transmitted to the device's processor 107. The processor 107 will thereafter control the device's pump 4100, heater 4101, drip-stop valve actuator assembly 4102 and other communication between the coffee machine 4400 (shown in FIG. 43) and any controllable components within the device. The remote device 4108 may be accomplished by any known wired or wireless communication and other devices in the network 4406. These methods include but are not limited to an interface that allows computers to communicate with peripherals commonly referred to by the trademark USB 4103, a personal area networking protocol commonly referred to by the trademark Bluetooth 4104, a wireless communication protocol commonly referred to by the trademark WIFI 4105 or via TCP/IP protocols, using, for example, the internet 4106. As show in FIG. 42, the same forms or methodologies of communication discussed with reference to FIG. 41 may be accomplished through the device's user interface 103.

Figure 43:
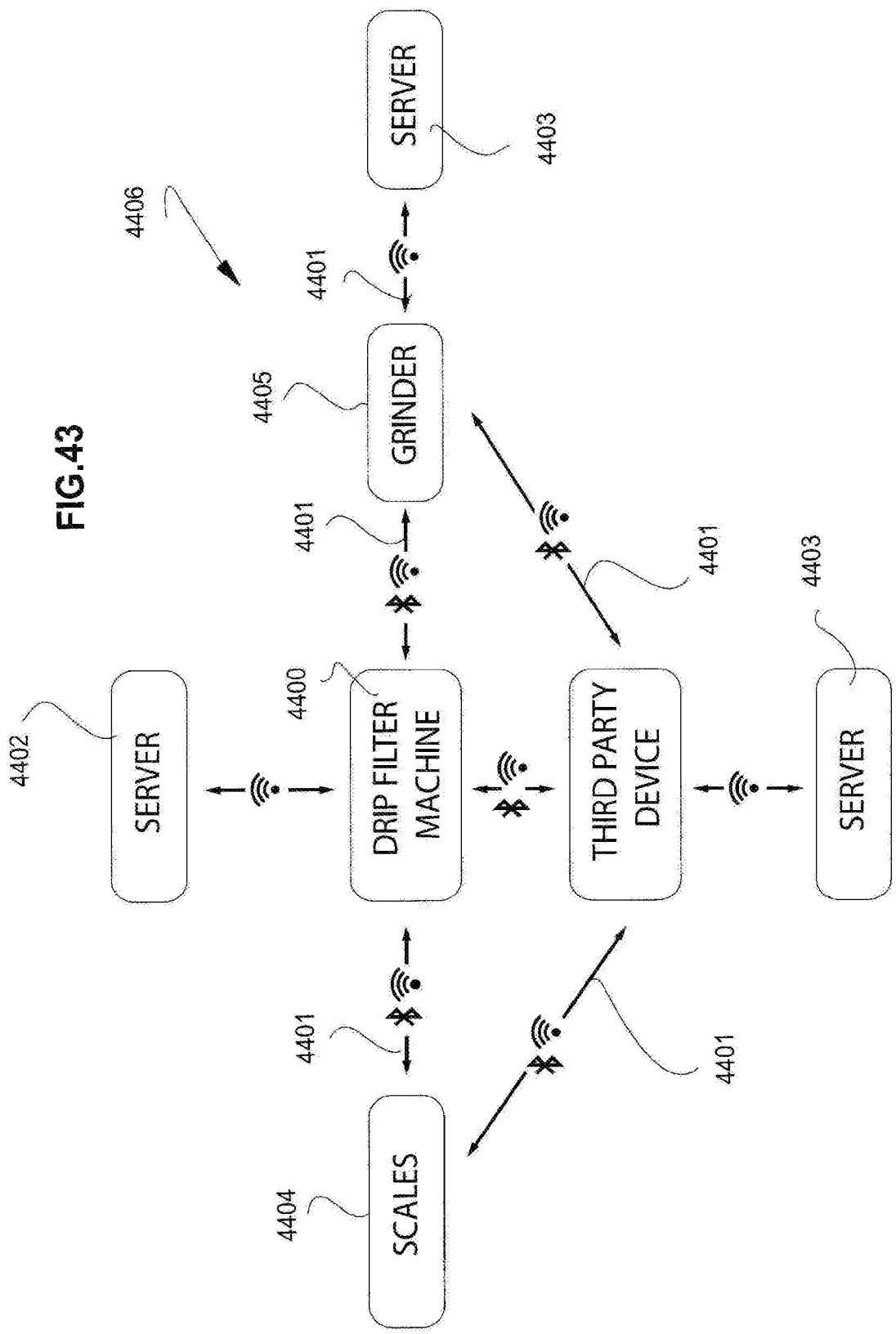
FIG. 43 is a schematic diagram of a network that incorporates a drip filter coffee making appliance.

As suggested by FIG. 43, a drip filter coffee appliance 4400 in accordance with the previous teachings may communicate or form a network 4406 over hard wired or wireless communication channels 4401 with remote computers 4402, information servers 4403 and other appliances such as weighing scales 4404 and coffee grinders 4405. For example, the device's processor 107 can receive information from a digital weighing scale 4404 expressing the weight of coffee that will be placed in the device's filter basket. This information can be used to determine or alter a brewing profile or its parameters. Similarly, a coffee grinder with wireless data transfer capabilities can transmit information to the device's processor 107, such as the grind setting. The processor 107 can use information about the grinder's grind setting to alter parameters or brew profiles so that they are compatible with the coarseness or fineness of the grind as indicated by the transmitted grind setting.

Figure 44:
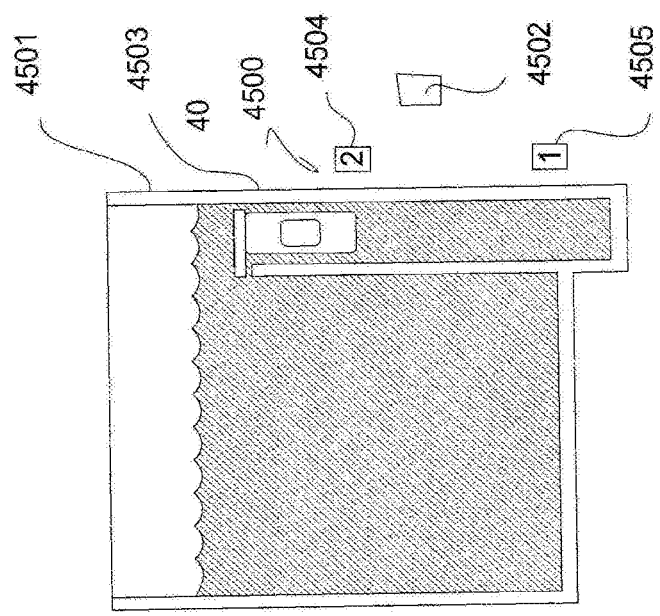
FIG. 44 is a schematic cross-sectional view of a water reservoir in a drip filter coffee machine.

As shown in FIG. 44, a pump such as the solenoid pump depicted, for example, in FIGS. 36 and 37 can be periodically re-calibrated to account for the expected and normal loss of pump efficiency or effectiveness overtime. This loss of effectiveness is generally due to scale build-up and ordinary wear. The reduction in pump effectiveness may cause problems. For example, as the pump's flow rate diminishes over time, the heater may become overly effective, creating undesirable steam in the system. In the aforementioned embodiments, the level sensing assembly 4500 in the appliance's water reservoir 4501 may be used in conjunction with a timer to determine the extent of degradation of the pump's performance as it ages. In one example, the device's processor 4502 measures a time interval, as the pump is discharging into the showerhead. The interval is the time it takes for the float's magnet or transducer 4503 to traverse the distance between an upper sensor 4504 and a lower sensor 4505. If there were no degradation, the time interval of this traverse would always be constant. The lengthening of the traverse time interval is indicative of the pump's loss of performance. Accordingly, the device's processor 107 can, from the re-calibration onward and thereafter either increase the pump's delivery rate or the duration of a discharge interval to account for the loss of performance.

As shown in FIGS. 45 and 46, a water dispenser or showerhead 4600 is carried on an underside of a hinged lid 4601. The lid includes a bifurcated cantilever 4603 that extends into the neck area 4602 of coffee machine as suggested by FIG. 1. In this example, the neck area 4602 has an upper portion that is generally "U" shaped, having a recess, pocket or mounting place 4604 for receiving the lid's cantilever 4603. The cantilever 4603 in this example, terminates in a pair of ears 4605, each having a through opening for receiving and binding onto the hinge spindle 4607 so as to rotate with it. The hinge spindle 4607 is supported by the neck area (as shown in FIG. 46) and passes through the cantilever 4603. The distal end of the hinge spindle 4608 mechanically couples to a mechanism 4609 that dampens the rotation of the hinge spindle 4607. The damping mechanism 4609 is restrained from rotation within the neck area by, for example, an anti-rotation fin 4610.

In the examples of FIGS. 45 and 46, a laterally symmetrical torsional spring 4611 surrounds the hinge spindle 4607 in the area between the ears 4605 of the lid or lid cantilever. Free ends of the spring 4611 (not shown) engage with the neck area 4602 so the central or projecting part 4612 of the spring 4611 biases the lid into an open orientation (suggested by FIGS. 3 and 4). The lid is opened by a clasp mechanism that is activated by a mechanical thumb switch (see 117 FIG. 1). When the activator 117 is operated, the lid is released for upward motion under the influence of the spring 4611. The upward motion is dampened by the damping mechanism 4609.

In the examples FIGS. 45 and 46, the hinge spindle 4607 has an extension 4613 that enters an opening and is retained by the damping mechanism 4609. The hinge spindle 4607 is also hollow or partially tubular, having a through opening 4614 in a sidewall. As shown in FIG. 7, the transverse opening in the sidewall 4614 is located, preferably, between the two coils of the torsion spring 4611 and in line with the midline axis 4701 of the showerhead 4600. In this way a flexible water carrying tube 4702 can run into an opening 4703 in the proximal end of the hinge spindle 4607, through the interior of the hollow hinge spindle 4607 and out the through opening 4614. The tube 4702 can then be connected to the showerhead 4600, for example, using a friction nipple or other conventional means 4620. This allows water to flow through to the showerhead or dispenser 4600 regardless of the lid's orientation.

Figure 47:
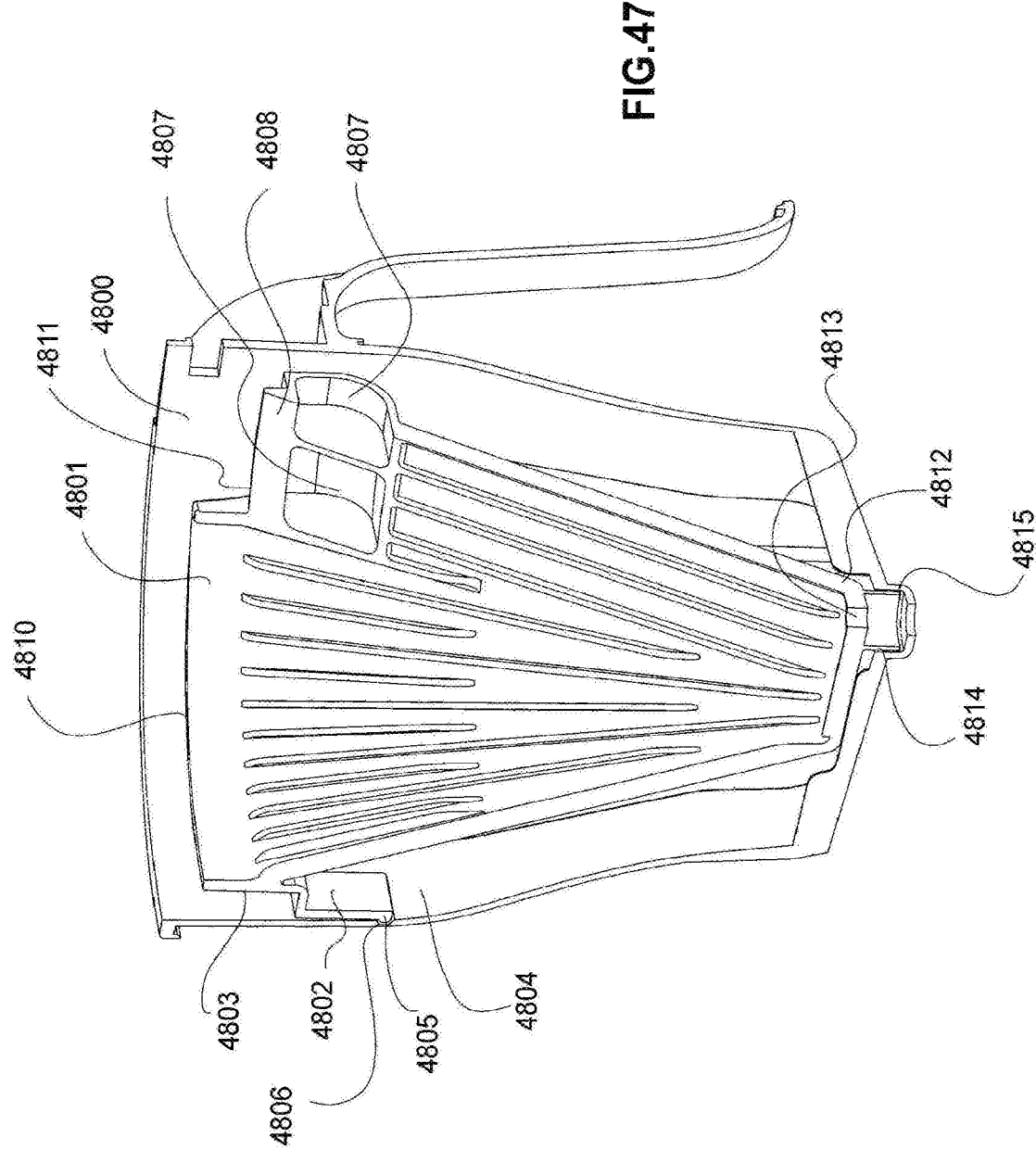
FIG. 47 is a perspective view, sectioned and broken away to show a filter insert in a filter basket.

As shown in FIG. 47, and as previously suggested by FIG. 14, a filter basket body 4800 can contain a filter adapter or filter insert 4801. In this example, the insert 4801 is positively located with respect to the filter basket 4800 by a resilient tab or finger 4802 that extends from an external surface of the insert 4803 to an interior side wall 4804 of the filter basket 4800. The finger 4802 may be provided with a locating bead 4805 at its free end, the bead engaging a groove or other recess 4806 formed into the interior of the filter basket side wall 4804. One or more finger pockets 4807 are located in the interior side wall 4808 of the insert 4801. In this example, two adjacent pockets or openings 4807 allow the insert to be lifted vertically from the filter basket 4800. In this example, the upper rim 4810 of the insert 4801 has formed in it, a notch or recess 4811 that forms an overflow channel for fluid contained within the insert 4810. In this example, a lower extent of the insert 4812 has an exit or discharge opening 4813 that is surrounded by a guide channel 4814 that fits into a receiving opening 4815 located at the bottom of the filter basket 4800.

Figure 48:
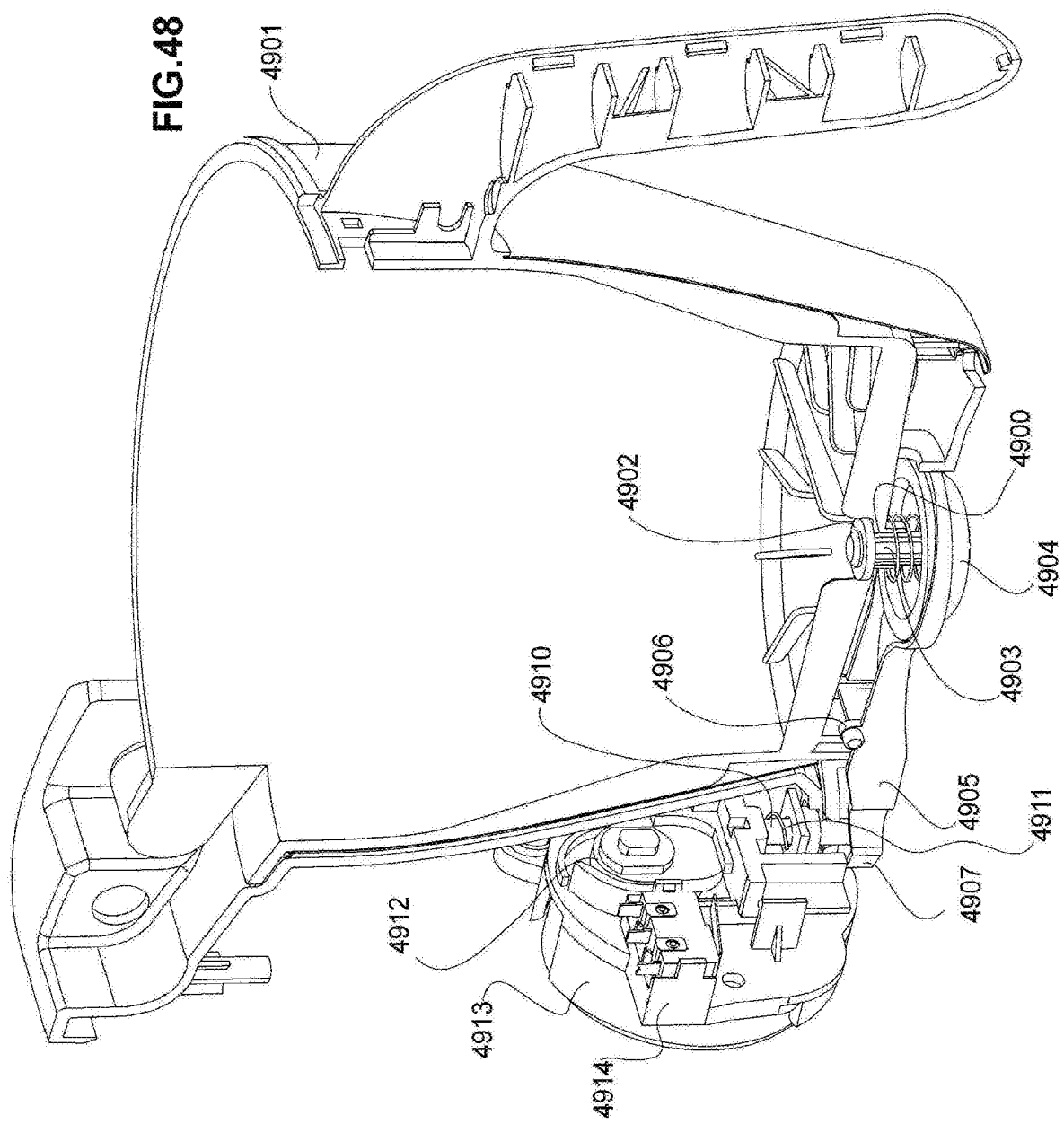
FIG. 48 is a cross sectional view, in perspective, showing a cam operated drip stop valve.
Figure 49:
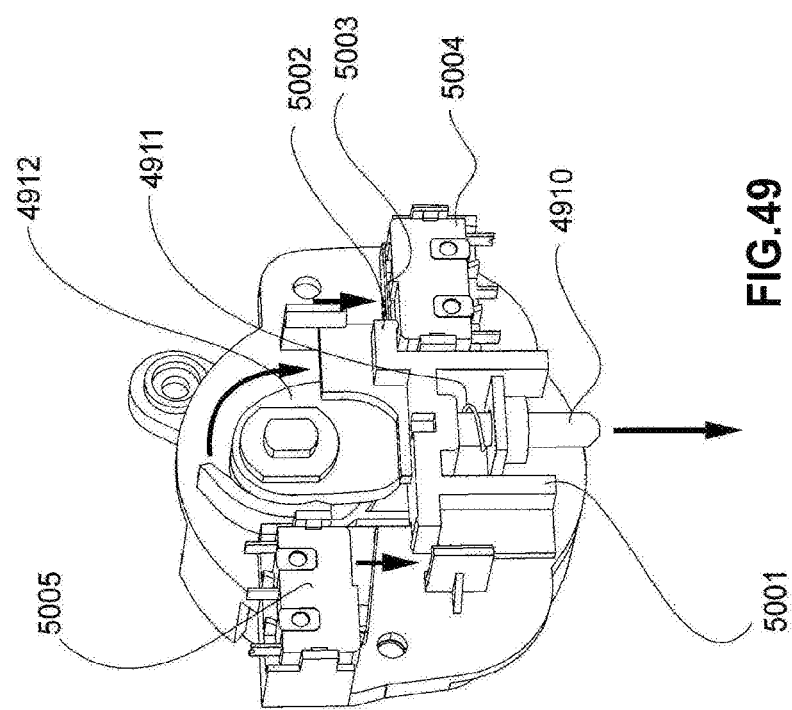
FIG. 49 is a perspective view of the motor, cam and pin shown in FIG. 48.

An alternative to the drip stop mechanism depicted in FIG. 2 is shown in FIG. 48. In this example, an opening at the bottom of the filter basket 4901 is sealed by an internal sealing member 4902. The sealing member 4902 is carried by a vertical post 4903 that is attached to an actuating head 4904. The actuating head 4904 is carried by a lever 4905 that pivots about an intermediate fulcrum 4906. The free end of the lever 4907 is acted upon by a vertically oriented pin 4910. The pin is biased away from the lever by a compression spring 4911 and driven toward the lever so as to actuate it by the rotation of a cam 4912. In this example, the cam 4912 is driven by a reversing synchronous motor 4913. The vertical limits of motion of the pin 4910 are detected by electronic switches or sensors such as micro switches 4914 that are contacted or at least actuated indirectly by the cam 4912. As suggested by FIG. 49, the vertically reciprocating pin 4910 is affixed to a vertically reciprocating carriage 5001 that is driven by the cam 4912. The vertical movement of the carriage 5001 is determined by the position of the rotating cam 4912. In it fully extended orientation, the carriage 5001 has an arm 5002 that makes contact with a first switch actuator 5003. Signals from the switch 5004 provided to the device's processor and are used as an indication that the drip stop valve has been actuated by the fully down orientation of the pin 4910. In the fully up position, the carriage 5001 contacts a second switch 5005. A signal provided from this switch 5005 to the device's processor indicates that the carriage is in the upmost orientation and that the pin 4910 has disengaged from the lever 4905.

Figure 50:
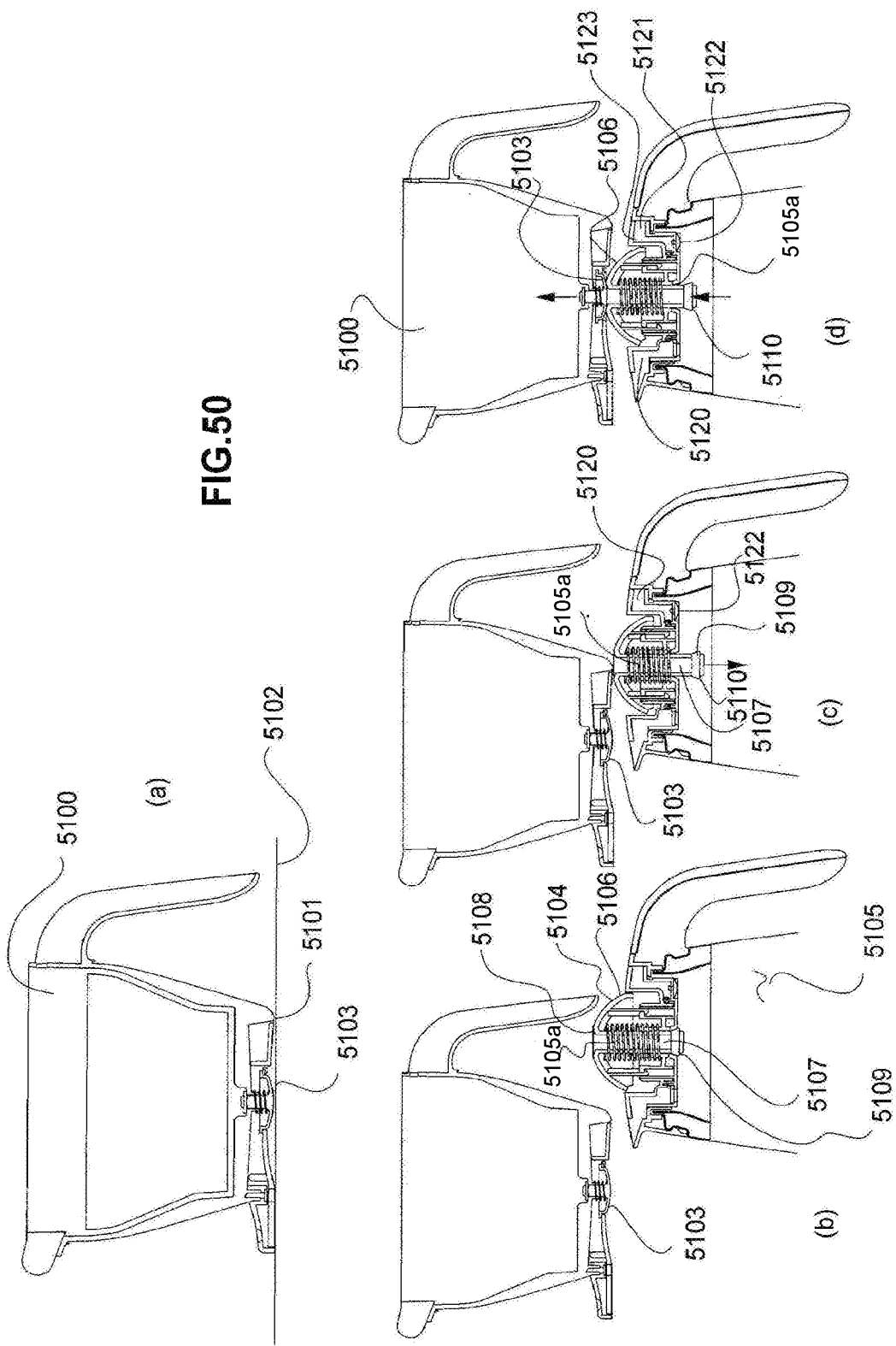
FIG. 50 are cross sectional views illustrating an interaction between a drip stop valve and a carafe.

As shown in FIG. 50, a filter basket 5100 has a lower rim or extremity 5101 upon which it can be rested on a flat surface 5102. In preferred embodiments, the drip stop actuating head 5103 is entirely or fully recessed vertically above the lower rim 5101 so that it does not protrude from the lower rim or interfere with the flat resting position of the filter basket 5100. Thus, it is important that a carafe's drip stop valve activator 5104 be the highest vertical structure of the carafe 5105. In this way, the carafe can slide, horizontally, under the lower rim 5101 and still make contact with the drip stop valve's actuation head 5103. In order to do this, the carafe's activator 5104 must reciprocate vertically and be biased upward by a compression spring 5105a. The dome-like activator 5104 has sloping or curved exterior surfaces 5106 that make contact with the lower rim of the basket 5101 and are pushed downwardly by it. Thus the carafe's activator 5104 comprises an arched or domed shaped shell having a centrally located vertical channel 5107. The vertical channel 5107 extends from an opening 5108 at the top of the activator 5104 to a seal 5109 located at a terminal end of the vertical passage 5107. As suggested by FIGS. 22, 23 and 50(c), when the activator 5104 is depressed by the lower rim 5101 or actuating head of the drip stop valve, it displaces the seal 5109, exposing flow channels or flow openings 5110 to dispense fluid delivered from the drip stop valve 5103 into the interior of the carafe 5105. As shown in FIG. 50(d), when the carafe is correctly located under the filter basket 5100, the carafe's activator 5104 is depressed against the bias of the spring 5105 and the actuator head 5103 of the drip stop valve is also displaced vertically allowing fluid to flow from the interior of the filter basket 5100, through the vertical channel 5107 into the interior of the carafe 5105. When the carafe is removed from below the filter basket, the drip stop valve's actuation head 5103 returns to its original and sealed or rest orientation by moving downward. Likewise, the carafe's activator 5104 is restored to its vertically upwardly extended position, thus sealing the flow openings 5101 and thus preventing inadvertent release of heat from the interior of the carafe. In this example, the lid of the carafe 5120 has upper and lower walls that create an insulating airspace 5121 within the lid structure. In this example, an airflow check valve 5122 is located on an underside of the lid and allows air within the cavity 5121 to flow into the interior of the carafe when liquids are removed from the carafe by pouring. Replenishing air is able to enter the interior cavity 5121 from a small vent opening 5123 formed, for example, on an upper surface of the lid.

Figure 51:
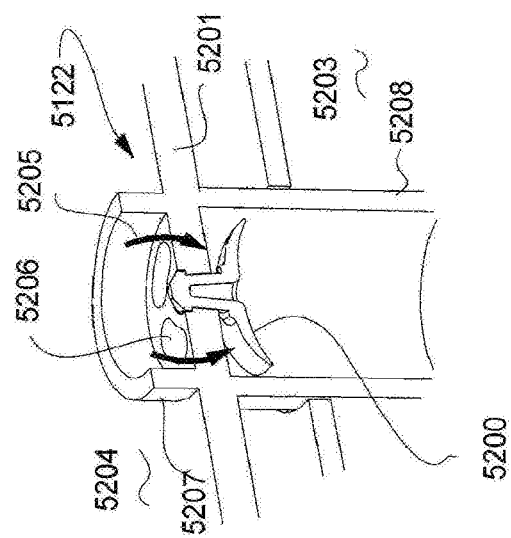
FIG. 51 is a perspective view, crossed sectioned, illustrating a check valve in a carafe.

As suggested by FIG. 51, the air inlet check valve 5122 comprises an elastomeric membrane or disk 5200 that is retained by a vertical structure 5201 of the lid 5120. The vertical structure 5201 essentially divides the interior of the carafe 5203 from the atmosphere 5204. As illustrated, air 5205 drawn into the interior 5203 flexes the valve element 5200 entering into the interior 5203 by through openings 5206 located above the flexible element 5200. In this example, the air entry openings 5206 are surrounded by an upright wall 5207 that prevents liquids from inadvertently entering the openings 5206. A second or lower circumferential wall 5208 may be located around the valve element 5200 to protect it from excessive contact with liquids. Similar structure is depicted in FIGS. 22 and 23.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

The invention claimed is:

1. A drip coffee making appliance machine, comprising:
   a water reservoir;
   a heater;
   a pump, the pump configured to draw a water flow from the water reservoir and provide the water flow to the heater;
   a water dispenser, the water dispenser receiving the water flow from the heater;
   a main body having a base, an upright body, and a filter basket removably supported above the base;
   a control unit, the control unit operable to independently control the pump and the heater so that the water flow from the reservoir through the heater is selectively heated by a selective operation of the heater so that hot water or cold water is delivered from the heater to the water dispenser; and
   a drip stop mechanism for sealing an opening at the bottom of the filter basket, said drip stop mechanism comprising:
      a sealing member for selectively sealing said opening; and
      a motor carried by the body and operatively connected to said control unit, said motor driving a cam to act on a pin, so as to actuate a lever and activate the sealing member.

2. The drip coffee machine of claim 1, further including a lid supported on the upright body above the base, the filter basket being removably supported below the lid.

3. The drip coffee machine of claim 1, further including a carafe supported on the base, with the filter basket above the carafe.

4. The drip coffee machine of claim 1, wherein the water reservoir is attached to the upright body.

5. The drip coffee machine of claim 1, wherein the pump and heater are located in the upright body.

6. The drip coffee machine of claim 1, wherein the sealing member is attached to an actuating head that is carried by the lever.

7. The drip coffee machine of claim 1, wherein the pin is biased away from the lever by a spring.

8. The drip coffee machine of claim 1, wherein the pin is a vertically reciprocating pin that is connected to a vertically reciprocating carriage driven by the cam.

* * * * *